(12) United States Patent
West et al.

(10) Patent No.: US 8,859,132 B2
(45) Date of Patent: Oct. 14, 2014

(54) VARIABLE VOLUME CONTAINMENT FOR ENERGY STORAGE DEVICES

(75) Inventors: Jon Kenneth West, Gainesville, FL (US); Martin Patrick Higgins, Old Field, NY (US); Eileen Higgins, legal representative, Old Field, NY (US); Julius Regalado, Gainesville, FL (US); Anthony George, Coventry, RI (US); Xin Zhou, Gainesville, FL (US); Nelson Citta, Lake City, FL (US); Myles Citta, Lake City, FL (US); Allen Michael, Gainesville, FL (US); Kenneth Cherisol, Mt. Laurel, NJ (US); Daniel J. West, Gainesville, FL (US); Barbara Patterson, Lake City, FL (US)

(73) Assignee: G4 Synergetics, Inc., Roslyn, NY (US)

( * ) Notice: Subject to any disclaimer, the term of this patent is extended or adjusted under 35 U.S.C. 154(b) by 565 days.

(21) Appl. No.: 12/694,638

(22) Filed: Jan. 27, 2010

(65) Prior Publication Data

US 2010/0190047 A1    Jul. 29, 2010

Related U.S. Application Data

(60) Provisional application No. 61/147,725, filed on Jan. 27, 2009, provisional application No. 61/181,194, filed on May 26, 2009.

(51) Int. Cl.
*H01M 6/42* (2006.01)
*H01M 6/48* (2006.01)
(Continued)

(52) U.S. Cl.
CPC ............ *H01M 10/0418* (2013.01); *H01M 2/06* (2013.01); *H01M 10/0477* (2013.01);
(Continued)

(58) Field of Classification Search
USPC ........... 429/156, 210, 66, 469, 185, 120, 101, 429/104, 53, 82, 160, 161; 361/434
See application file for complete search history.

(56) References Cited

U.S. PATENT DOCUMENTS 3,169,889 A    2/1965    Zahn
3,664,877 A    5/1972    Shaw
(Continued)

FOREIGN PATENT DOCUMENTS

CN    1805183 A    7/2006
DE    39 16 050 A1    11/1990
(Continued)

OTHER PUBLICATIONS

ENGAGE 8407, Technical Information Sheet, The Dow Chemical Company, retrieved online on Apr. 15, 2013 from: http://catalog.ides.com/docselect.aspx?I=61252&E=49412&DOC=DOWTDS&DS=123&DK=STD&DC=en.*

(Continued)

*Primary Examiner* — Kenneth Douyette
(74) *Attorney, Agent, or Firm* — Ropes & Gray LLP

(57) ABSTRACT

A stacked energy storage device (ESD) has at least two cell segments arranged in a stack. Each cell segment may have a first electrode unit having a first active material electrode, a second electrode unit having a second active material electrode, and an electrolyte layer between the active material electrodes. Variable volume containment may be used to control the inter-electrode spacing within each cell segment. In some embodiments, one or more dynamic flexible gaskets may be included in each cell segment to seal the electrolyte within the cell segment and to deform in preferred directions. In some embodiments, hard stops may set the inter-electrode spacing of the ESD.

19 Claims, 11 Drawing Sheets

(51) Int. Cl.
*H01M 2/10* (2006.01)
*H01M 2/06* (2006.01)
*H01M 10/04* (2006.01)
*H01M 4/70* (2006.01)
*H01M 2/08* (2006.01)
*H01M 2/18* (2006.01)
*H01M 10/28* (2006.01)
*H01M 4/02* (2006.01)
*H01M 10/42* (2006.01)

(52) U.S. Cl.
CPC ............ *H01M 10/0468* (2013.01); *H01M 6/48* (2013.01); *H01M 10/0413* (2013.01); *H01M 10/286* (2013.01); *H01M 10/044* (2013.01); *H01M 10/045* (2013.01); *H01M 4/70* (2013.01); *H01M 2004/029* (2013.01); *H01M 2/08* (2013.01); *H01M 10/282* (2013.01); *Y02E 60/124* (2013.01); *H01M 10/28* (2013.01); *H01M 2/18* (2013.01); *H01M 10/4235* (2013.01)
USPC ............ 429/156; 429/210; 429/161; 429/160

(56) References Cited

U.S. PATENT DOCUMENTS

| | | | |
|---|---|---|---|
| 3,783,024 A * | 1/1974 | Holland et al. | 429/66 |
| 3,841,914 A | 10/1974 | Boyle et al. | |
| 4,152,492 A | 5/1979 | McCartney et al. | |
| 4,159,367 A * | 6/1979 | Berchielli et al. | 429/469 |
| 4,164,068 A | 8/1979 | Shropshire et al. | |
| 4,258,109 A | 3/1981 | Liana et al. | |
| 4,267,243 A | 5/1981 | Park et al. | |
| 4,269,907 A | 5/1981 | Momyer et al. | |
| 4,307,161 A | 12/1981 | Brown | |
| 4,331,745 A | 5/1982 | Catanzarite | |
| 4,352,867 A | 10/1982 | Catanzarite | |
| 4,385,101 A | 5/1983 | Catanzarite | |
| 4,539,268 A | 9/1985 | Rowlette | |
| 4,542,082 A | 9/1985 | Rowlette | |
| 4,565,749 A | 1/1986 | Van Ommering et al. | |
| 4,567,119 A | 1/1986 | Lim | |
| 4,614,025 A | 9/1986 | Van Ommering et al. | |
| 4,677,041 A | 6/1987 | Specht | |
| 4,828,939 A | 5/1989 | Turley et al. | |
| 4,894,299 A | 1/1990 | Morse | |
| 4,909,955 A | 3/1990 | Morris et al. | |
| 4,927,717 A | 5/1990 | Turley et al. | |
| 4,964,878 A | 10/1990 | Morris | |
| 5,141,828 A | 8/1992 | Bennion et al. | |
| 5,145,752 A | 9/1992 | Goldstein et al. | |
| 5,185,218 A | 2/1993 | Brokman et al. | |
| 5,190,833 A | 3/1993 | Goldstein et al. | |
| 5,344,723 A | 9/1994 | Bronoel et al. | |
| 5,389,464 A | 2/1995 | Specht | |
| 5,393,617 A | 2/1995 | Klein | |
| 5,409,787 A | 4/1995 | Blanyer et al. | |
| 5,411,818 A | 5/1995 | Barlow et al. | |
| 5,464,453 A | 11/1995 | Tong et al. | |
| 5,478,363 A | 12/1995 | Klein | |
| 5,514,488 A | 5/1996 | Hake et al. | |
| 5,552,243 A | 9/1996 | Klein | |
| 5,561,380 A | 10/1996 | Sway-Jin et al. | |
| 5,567,544 A | 10/1996 | Lyman | |
| 5,582,622 A | 12/1996 | Lafollette | |
| 5,582,931 A | 12/1996 | Kawakami | |
| 5,585,142 A | 12/1996 | Klein | |
| 5,593,797 A | 1/1997 | Brecht | |
| 5,595,839 A | 1/1997 | Hossain | |
| 5,611,823 A | 3/1997 | Klein | |
| 5,618,318 A | 4/1997 | Reddy et al. | |
| 5,652,073 A | 7/1997 | Lenhart et al. | |
| 5,656,388 A | 8/1997 | Bugga et al. | |
| 5,666,041 A | 9/1997 | Stuart et al. | |
| 5,667,909 A | 9/1997 | Rodriguez et al. | |
| 5,682,592 A | 10/1997 | Yun et al. | |
| 5,698,342 A | 12/1997 | Klein | |
| 5,698,967 A | 12/1997 | Baer et al. | |
| 5,711,988 A | 1/1998 | Tsai et al. | |
| 5,744,265 A | 4/1998 | Barker et al. | |
| 5,752,987 A | 5/1998 | Yang | |
| 5,766,789 A | 6/1998 | James et al. | |
| 5,821,009 A | 10/1998 | Hall | |
| 5,849,430 A | 12/1998 | Lee | |
| 5,851,698 A | 12/1998 | Reichman et al. | |
| 5,882,817 A | 3/1999 | Hall et al. | |
| 5,916,709 A | 6/1999 | Arias et al. | |
| 5,958,088 A | 9/1999 | Vu et al. | |
| 5,980,977 A | 11/1999 | Deng et al. | |
| 5,982,143 A | 11/1999 | Stuart | |
| 6,063,525 A | 5/2000 | LaFollette | |
| 6,074,774 A | 6/2000 | Semmens et al. | |
| 6,136,466 A | 10/2000 | Takeuchi et al. | |
| 6,190,795 B1 | 2/2001 | Daley | |
| 6,330,925 B1 | 12/2001 | Ovshinsky et al. | |
| 6,399,239 B2 | 6/2002 | Bolstad et al. | |
| 6,399,240 B1 | 6/2002 | Jan | |
| 6,413,668 B1 | 7/2002 | Sandberg et al. | |
| 6,503,658 B1 | 1/2003 | Klein et al. | |
| 6,514,296 B1 | 2/2003 | Tsai et al. | |
| 6,555,267 B1 | 4/2003 | Broman et al. | |
| 6,557,655 B2 | 5/2003 | Ovshinsky et al. | |
| 6,565,836 B2 | 5/2003 | Ovshinsky et al. | |
| 6,740,446 B2 | 5/2004 | Corrigan et al. | |
| 6,759,034 B2 | 7/2004 | Ovshinsky et al. | |
| 6,806,001 B1 | 10/2004 | Benczur-Uermoessy et al. | |
| 6,824,914 B2 | 11/2004 | Iyer | |
| 6,837,321 B2 | 1/2005 | Ovshinsky et al. | |
| 6,887,620 B2 | 5/2005 | Klein et al. | |
| 6,908,711 B2 | 6/2005 | Fauteux et al. | |
| 6,969,567 B1 | 11/2005 | Higley et al. | |
| 6,986,967 B2 | 1/2006 | Barton et al. | |
| 7,063,911 B1 | 6/2006 | Nagai et al. | |
| 7,097,937 B2 | 8/2006 | Fredriksson et al. | |
| D533,832 S | 12/2006 | Hock | |
| 7,144,654 B2 | 12/2006 | LaFollette et al. | |
| 7,163,765 B2 | 1/2007 | Hosaka et al. | |
| 7,195,840 B2 | 3/2007 | Kaun | |
| 7,220,516 B2 | 5/2007 | Oosawa et al. | |
| 7,244,527 B2 | 7/2007 | Klein | |
| 7,258,949 B2 | 8/2007 | Frederiksson et al. | |
| 7,279,248 B2 | 10/2007 | Fukuzawa et al. | |
| 7,320,846 B2 | 1/2008 | Watanabe et al. | |
| 7,326,493 B2 | 2/2008 | Martinet et al. | |
| 7,358,008 B2 | 4/2008 | Nanno et al. | |
| 7,384,707 B2 | 6/2008 | Nagayama et al. | |
| 7,445,869 B2 | 11/2008 | Puester et al. | |
| 7,501,206 B2 | 3/2009 | Watanabe et al. | |
| 7,794,877 B2 | 9/2010 | Ogg et al. | |
| 2002/0160263 A1 | 10/2002 | Corrigan et al. | |
| 2003/0013016 A1 | 1/2003 | Puester et al. | |
| 2003/0129489 A1 | 7/2003 | Kamisuki et al. | |
| 2004/0086779 A1 | 5/2004 | Higley et al. | |
| 2004/0157101 A1 | 8/2004 | Smedley | |
| 2004/0219428 A1 | 11/2004 | Nagayama | |
| 2004/0229107 A1 | 11/2004 | Smedley | |
| 2005/0003270 A1 | 1/2005 | Phillips | |
| 2005/0106456 A1 * | 5/2005 | Puester et al. | 429/185 |
| 2005/0112471 A1 | 5/2005 | Chen et al. | |
| 2005/0123829 A1 | 6/2005 | Fukui et al. | |
| 2005/0147876 A1 | 7/2005 | Izumi et al. | |
| 2005/0260493 A1 | 11/2005 | Frederiksson et al. | |
| 2006/0003223 A1 | 1/2006 | Willson et al. | |
| 2006/0068267 A1 * | 3/2006 | Frank et al. | 429/38 |
| 2006/0115729 A1 | 6/2006 | Lee | |
| 2006/0292443 A1 | 12/2006 | Ogg et al. | |
| 2008/0070106 A1 | 3/2008 | Hock et al. | |
| 2008/0090146 A1 | 4/2008 | Batson | |
| 2008/0124625 A1 | 5/2008 | Hock et al. | |

(56) References Cited

U.S. PATENT DOCUMENTS

| | | |
|---|---|---|
| 2009/0023061 A1 | 1/2009 | Ogg et al. |
| 2009/0053586 A1 | 2/2009 | Fredriksson et al. |
| 2010/0304216 A1 | 12/2010 | Ogg et al. |

FOREIGN PATENT DOCUMENTS

| | | |
|---|---|---|
| DE | 196 08 326 A1 | 9/1997 |
| EP | 0 025 663 A2 | 3/1981 |
| EP | 0 039 557 A1 | 11/1981 |
| EP | 0 040 458 A2 | 11/1981 |
| EP | 0 079 226 A1 | 5/1983 |
| EP | 0 188 873 A2 | 7/1986 |
| EP | 0 199 493 A1 | 10/1986 |
| EP | 0 221 347 A1 | 5/1987 |
| EP | 0 255 201 A2 | 2/1988 |
| EP | 0 187 145 B1 | 3/1991 |
| EP | 0 227 830 B1 | 9/1991 |
| EP | 0 221 183 B1 | 4/1992 |
| EP | 0 512 417 A1 | 11/1992 |
| EP | 0 551 204 A1 | 7/1993 |
| EP | 0 730 316 A1 | 9/1996 |
| EP | 0 800 223 A2 | 10/1997 |
| EP | 0 863 560 A2 | 9/1998 |
| EP | 0 863 565 A2 | 9/1998 |
| EP | 0 800 223 B1 | 8/2000 |
| EP | 0 787 365 B1 | 2/2001 |
| EP | 0 755 306 B1 | 1/2002 |
| EP | 1 195 355 A1 | 4/2002 |
| EP | 1 329 973 A1 | 7/2003 |
| EP | 1 391 961 | 2/2004 |
| EP | 1 418 638 A2 | 5/2004 |
| EP | 1 422 773 A1 | 5/2004 |
| EP | 1 422 780 A1 | 5/2004 |
| EP | 1 427 049 A1 | 6/2004 |
| EP | 1 445 809 A2 | 8/2004 |
| EP | 1 478 035 A2 | 11/2004 |
| EP | 1 482 582 A2 | 12/2004 |
| EP | 1 487 034 A2 | 12/2004 |
| EP | 1 841 001 A1 | 10/2007 |
| FR | 2 276 704 | 1/1976 |
| FR | 2 677 812 | 12/1992 |
| FR | 2 692 077 | 12/1993 |
| FR | 2 700 639 | 7/1994 |
| GB | 2 060 983 A | 5/1981 |
| GB | 1596106 | 8/1981 |
| GB | 2 150 739 A | 7/1985 |
| GB | 2 269 977 A | 3/1994 |
| GB | 2 278 713 A | 12/1994 |
| GB | 2 294 803 A | 5/2008 |
| JP | 58 220359 | 12/1983 |
| JP | 58 223262 | 12/1983 |
| JP | 63 266766 | 11/1988 |
| JP | 4-95341 | 3/1992 |
| JP | 11-250886 | 9/1999 |
| JP | 2006252848 | 9/2006 |
| JP | 2008 041523 | 2/2008 |
| WO | WO-94/11915 A1 | 5/1994 |
| WO | WO 94/17563 | 8/1994 |
| WO | WO 98/15962 | 4/1998 |
| WO | WO 2004/079851 | 9/1999 |
| WO | WO 03/026042 | 3/2003 |
| WO | WO 03/032416 A1 | 4/2003 |
| WO | WO 2006/119289 A2 | 11/2006 |
| WO | WO 2008/023240 | 2/2008 |
| WO | WO 2008/023244 | 2/2008 |
| WO | WO 2008/059409 | 5/2008 |
| WO | WO 2008/070914 | 6/2008 |
| WO | WO 2008/081280 | 7/2008 |
| WO | WO 2008/130042 | 10/2008 |

OTHER PUBLICATIONS

"Abut." Dictionary.com n.d. Web Dec. 17, 2012.
"Adjacent." Dictionary.com n.d. Web Dec. 17, 2012.
Brown et al., "Bipolar Nickel-Metal Hydride Battery for Hybrid Electric Vehicles," The Fourteenth Annual Battery Conference on Applications and Advances, pp. 19-24, Jan. 12-15, 1999.
Cole et al., "Bipolar Nickel-Metal Hydride Batteries for Aerospace Applications," Aerospace and Electronic Systems Magazine, IEEE, vol. 15, Issue 1, pp. 39-45, Jan. 2000.
Golben et al., "A Low Pressure Bipolar Nickel Hydrogen Battery," Twelfth Annual Battery Conference on Applications and Advances, pp. 307-312, Jan. 14-17, 1997.
Klein et al., "Bipolar Nickel Metal Hydride Battery," 2003.
LaFollette et al., "Microfabricated Secondary Batteries for Remote, Autonomous, Electronic Devices," Sixteenth Annual Battery Conference on Applications and Advances, pp. 349-354, Jan. 9-12, 2001.
Landi et al., "Scale-Up of Manufacturing Processes for a Bipolar Nickel-Metal Hydride Aircraft Battery," Procs. 40th Power Sources Conf., Jun. 10-13, 2002.
Ohms et al., "Alkaline Batteries for Applications in Telecommunication," Telecommunications Energy Special, 2000, Accumulatorenwerke HOPPECKE, Germany, pp. 111-114, May 7-10, 2000.
Plivelich et al., "Pulse Power Nickel Metal Hydride Battery," 2002 Power Systems Conference, Electro Energy, Inc., 02PSC-69, pp. 1-6, Oct. 29-31, 2002.
Reisner et al., "Bipolar Nickel-Metal Hydride Battery for Hybrid Vehicles," Aerospace and Electronic Systems Magazine, IEEE, vol. 9, Issue 5, pp. 24-28, May 1994.

* cited by examiner

US 8,859,132 B2

VARIABLE VOLUME CONTAINMENT FOR ENERGY STORAGE DEVICES

CROSS-REFERENCE TO RELATED APPLICATION

This application claims the benefit of U.S. Provisional Application No. 61/147,725, filed Jan. 27, 2009, and U.S. Provisional Application No. 61/181,194, filed May 26, 2009, both of which are hereby incorporated by reference herein in their entireties.

FIELD OF THE INVENTION

This invention relates generally to energy storage devices (ESDs) and, more particularly, this invention relates to ESDs that incorporate variable volume containment.

BACKGROUND OF THE INVENTION

A feature of sealed ESDs is containment and isolation of the cells within the ESD from external contamination and/or interference. Conventional containment devices (e.g., ESD wrappers) provide containment and isolation for the various phases of the ESD materials, such as the electrolyte solvent mixture and the active materials. It is often necessary to contain these ESD materials while the cells are in rest or in operation. While the cells are in rest or in operation certain materials contained within the cell experience changes in state. The fluctuations in state result in variations in cell pressure which impart stresses on the containment device.

Pressure within a fixed volume container is proportional to the amount and state or states of the active materials within the container. For example, in metal hydride ESDs the electrochemical couple includes a metal hydride alloy within the anode and a metal hydroxide within the cathode. Each of these materials undergoes state changes which result in a net volumetric shift within the container. The volumetric shift may result in changes in cell pressure and/or net changes in free volume. Therefore, active material state changes can result in less, or more, available free volume, where free volume refers the difference in the unit cell volume from the volume of all of materials contained within the cell. In the exemplary metal hydride configuration, hydraulic pressures from displaced liquids, gas phase components of the electrolyte solvent mixture, and partial pressures of the vapor phase of the electrolyte solvent mixture generate forces against the container walls. The pressures attributed to the changing active material states also cause electrode surfaces to physically press against container walls. If the stress exceeds the capability of the containment device, the device may be compromised and may not function properly.

Conventional ESDs have been manufactured as either a wound cell ESD that has only two electrodes or a standard prismatic cell ESD that has many plate sets in parallel. In both of these types, the electrolyte is shared everywhere within the ESD. The wound cell structure and prismatic cell structure both employ rigid, fixed volume containment. These structures require strict accounting of the materials within the rigid container because the container does not allow volumetric expansion and/or contraction (i.e., the amount of free volume is fixed). The amount of free volume may affect the operation of the ESD as too much free volume results in poor performance (e.g., a loose cell) and too little free volume results in a potentially explosive device. In some instances the forces generated during operation of these conventional ESDs may exceed the material limits of the container and cause the container to rupture. When the container ruptures due to high pressures, the internal constituents are ejected with a significant amount of energy.

Accordingly, it would be desirable to provide an ESD having variable volume containment.

SUMMARY OF THE INVENTION

In view of the foregoing, apparatus and methods are provided for ESDs having variable volume containment.

In some embodiments of the present invention, there is provided an ESD having a stack of a plurality of bi-polar electrode units. Each electrode unit may include a conductive substrate, a positive active material electrode layer on a first surface of the conductive substrate, and a negative active material electrode layer on a second surface of the conductive substrate. An electrolyte layer may be provided between each pair of adjacent electrode units. A flexible gasket may be positioned about each of the electrolyte layers where the gasket may be mechanically deformable in a predetermined manner.

In accordance with an embodiment, there is provided an ESD in which inter-electrode spacing is maintained. The ESD may include a plurality of cell segments, where each cell segment may includes a first conductive substrate having a first active material electrode layer and a second conductive substrate having a second active material electrode layer. An electrolyte layer may be provided between the first and second active material electrode layers. A plurality of hard stops may be provided where each respective conductive substrate may be fixedly positioned on a respective hard stop, and the hard stop may be configured to set the inter-electrode spacing of the ESD.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
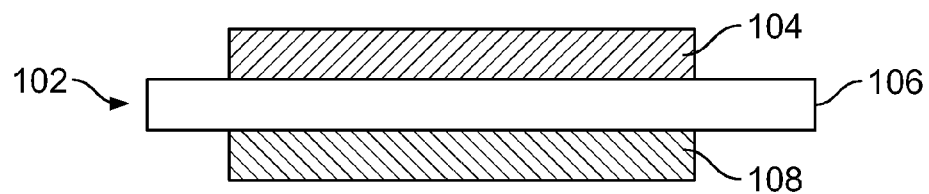
FIG. 1 shows a schematic cross-sectional view of a structure of a bi-polar electrode unit (BPU) according to an embodiment of the invention.

Apparatus and methods are provided for energy storage devices (ESDs) having variable volume containment, and are described below with reference to FIGS. 1-15. The present invention relates to ESDs such as, for example, batteries, capacitors, or any other suitable electrochemical energy or power storage devices which may store and/or provide electrical energy or current. It will be understood that while the present invention is described herein in the context of a stacked bi-polar ESD having variable volume containment, the concepts discussed are applicable to any intercellular electrode configuration including, but not limited to, parallel plate, prismatic, folded, wound and/or bi-polar configurations, any other suitable configuration, or any combinations thereof.

As defined herein, "inter-electrode spacing" is the distance between active material electrode layers in a stacked bi-polar ESD. This may be applied, for example, to the distance between a positive and negative electrode in a cell that only contains one positive and one negative electrode. In some embodiments, this may be applied to a cell with multiple electrode sets or segments within the same cell. For cells with multiple electrodes or electrode segments, there may be multiple inter-electrode spacings.

ESDs with sealed cells in a stacked formation have been developed to generally include a series of stacked bi-polar electrode units (BPUs). Each of these BPUs is provided with a positive active material electrode layer and a negative active material electrode layer coated on opposite sides of a current collector. Any two BPUs may be stacked on top of one another with an electrolyte layer provided between the positive active material electrode layer of one of the BPUs and the negative active material electrode layer of the other one of the BPUs for electrically isolating the current collectors of those two BPUs. The current collectors of any two adjacent BPUs, along with the active material electrode layers and electrolyte therebetween, are a sealed single cell or cell segment. An ESD that includes a stack of such cells, each having a portion of a first BPU and a portion of a second BPU, shall be referred to herein as a "stacked bi-polar" ESD.

Variable volume containment may benefit non-conventional ESD configurations such as the multi-cell bi-polar ESD architecture. In the bi-polar ESD configuration, cells are stacked in series using common collector plates between cells, which results in a reduction in containment materials and thereby a reduction in mass and/or volume. One potential drawback to the bi-polar configuration is variability in the inter-electrode spacing during operation and cycling of the ESD. Cell pressures may build, causing electrode surfaces to be pushed apart. This movement increases the gap distance between electrode surfaces and influences internal resistance of the device. Further, undesirable cascading effects may result with increasing inter-electrode spacing, such as increased electrical impedance and decreased charge efficiency, discharge capacity, and rate capability, for example.

Conventional stacked bi-polar ESDs use flat electrode plates. By using flat plates and isolating them by use of an edge seal, cells in a stacked electrochemical ESD may operate substantially independently. As the independent cells are charged and discharged, slight pressure differences may develop between adjacent cells. If the pressure difference between the adjacent cells exceeds a few pounds per square inch, then the flat electrode may deflect from the first cell towards the second cell. This deflection may strain the separator material of the second cell, creating a "hot spot" where a short circuit may develop. Because the physical components and the chemistry of individual cells may generally be slightly different from one another, pressure differentials between cells may generally exist.

For example, if cell voltage is allowed to exceed the breakdown voltage of an electrolyte solvent (e.g., water in the case of NiMH), the formation of the solvent's respective gas phase components (e.g., oxygen and hydrogen) may result. The rate at which the gas phase components are formed and released may affect the gas phase pressure component of a cell and influence the active material electrode matrix. Gas phase formation rates may be related to, for example, the internal resistance of the ESD, state of charge, stage of charge acceptance, and the rate of charge. Excessive gas phase formation rates may degrade the mechanical stability of the electrode matrix, for example, by decoupling the active materials from the electrode matrix, which may result in capacity fade of the ESD.

If the combined pressure (e.g., hydraulic, mechanical, and gas/vapor phase pressures) exceeds the electrode coupling pressure, the electrodes may separate. An increased gap distance may allow active materials to migrate out of the electrode matrix causing a fade in capacity with each cycle. Active materials may eventually migrate through and/or around the separator, potentially causing undesirable effects such as, for example, premature breakdown of electrodes and shorts within the individual cells. Variable volume containment may mitigate the cascade of undesirable effects by allowing the electrode surfaces to remain substantially abutted to the separator, thereby holding active materials compliantly within an electrode matrix.

Performance measures commonly used to describe ESDs may be specific energy, having units of Watt-hr/kg and/or Watt-hr/L, and specific power, having units of Watts/kg and/or Watts/L. These performance measures may favor relatively light weight and/or low volume devices. A bi-polar ESD may allow for the mass and/or volume of a containment device to be reduced, thereby yielding an advantage over conventional ESD packs such as wound cell and prismatic cell ESDs. An issue in the development of bi-polar ESDs, however, has been that active materials may change shape during operation and cycling of the ESD, which may result in electrode separation.

The cell mechanics of a bi-polar ESD may be a complex and multivariable problem. The behavior of a cell may be related to a forcing function, or stimulus, and the physical and thermodynamic state or states of the active materials within an electric field. To predict the instantaneous or near-instantaneous cell dynamics, the instantaneous or near-instantaneous state or states of materials within substantially the entire device may be needed. Therefore, in order to keep the description of the behavior of an ESD relatively simplified, state descriptions (e.g., charged state and discharged state) may be used.

The thermodynamic state of the ESD may be driven by an external forcing function (e.g., a voltage or current source and/or a load). A connection to an external forcing function may allow electrochemical stimulation of the ESD. The quality of the connection between an external forcing function and the active material or materials of the ESD may be an important parameter because there may be a plurality of interfaces in a device where interfacial reactions may occur. For example, interfacial reactions may occur at the active material interface, the solvent-electrolyte interface, and the cathode interface. A relatively low quality connection between an external forcing function and the active material or materials of the ESD may negatively affect the interfacial reactions at some or all of these interfaces.

The physical orientation of the electrode surfaces and their position relative to mobile ions contained within a solvent (e.g., an electrolyte) may have an influence on electrochemical kinetics. The forces generated on a charged particle may be substantially directly proportional, for example, to the particle's charge and the electric field strength. In some instances, the forces generated on the charged particle may result in a force imbalance and may cause a net acceleration of the charged particle in the direction of the resultant force vector.

The forces generated on a charged particle may be forces of attraction and/or repulsion. The attractive and repulsive force contributions may be dependent on electrode spacing. Thus, the inter-electrode spacing of the ESD may influence electrodynamic forces on the charged particle. The attractive force and the repulsive force may contribute to a net acceleration on the charged particle. When both the repulsive and the attractive forces are considered in the resultant force, the net force or acceleration increases with a decrease in electrode spacing. A bi-polar ESD that employs variable volume containment may allow for the inter-electrode spacing to be controlled dynamically via the application of a physical load. Variable volume containment may allow the application of a physical load to the containment device and dynamic control of inter-electrode spacing. Dynamic control of inter-electrode spacing may be provided, for example, by physically adjusting forces normal to the orientation of the electrode surfaces.

Another variable that may affect an ESD may be the thermodynamic state of the active materials. The active materials may cycle between thermodynamic states which may result in shape change of the active materials. For example, the active materials in a nickel-metal hydride (NiMH) device that may influence cell pressure through changes in state may be metal hydride, nickel hydroxide, and electrolyte solvent (e.g., both gas and vapor pressure components).

State change of the active materials may result in a net volumetric expansion and/or contraction of the containment device. For the solid active materials (e.g., metal hydride alloys or nickel hydroxide) the differential expansion may be as great as 300 percent. Thus, active materials may impart, in some cases, a relatively substantial force on the containment device during cycling. In some embodiments, if the force exceeds the capabilities of the containment device material or materials, breaches may occur. This may potentially be dangerous due to the relatively high kinetic energy of the material or materials that may be expelled from the containment device. Therefore, it may be preferable to design a containment device to meet the volumetric needs of the active materials while also maintaining the inter-electrode spacing of the entire device may be needed.

interfaces. The volumetric component of the containment device may be designed so that the amount of volume of the containment device may be no less than what is needed given the state or states of the active materials.

FIG. 1 shows an illustrative "flat plate" bi-polar electrode unit or BPU 102, in accordance with an embodiment of the present invention. Flat plate structures for use in stacked cell ESDs are discussed in more detail in Ogg et al. U.S. patent application Ser. No. 11/417,489, and Ogg et al. U.S. patent application Ser. No. 12/069,793, both of which are hereby incorporated by reference herein in their entireties. BPU 102 may include a positive active material electrode layer 104 that may be provided on a first side of an impermeable conductive substrate or current collector 106, and a negative active material electrode layer 108 that may be provided on the other side of impermeable conductive substrate 106 (see, e.g., Fukuzawa et al., U.S. Pat. No. 7,279,248, issued Oct. 9, 2007, which is hereby incorporated by reference herein in its entirety).

It will be understood that the bi-polar electrode may have any suitable shape or geometry. For example, in some embodiments of the present invention, the "flat plate" BPU may alternatively, or additionally, be a "dish-shaped" electrode. The dish-shaped electrode may reduce pressures that may develop during operation of a bi-polar ESD. Dish-shaped and pressure equalizing electrodes are discussed in more detail in West et al. U.S. patent application Ser. No. 12/258,854, which is hereby incorporated by reference herein in its entirety.

Figure 2:
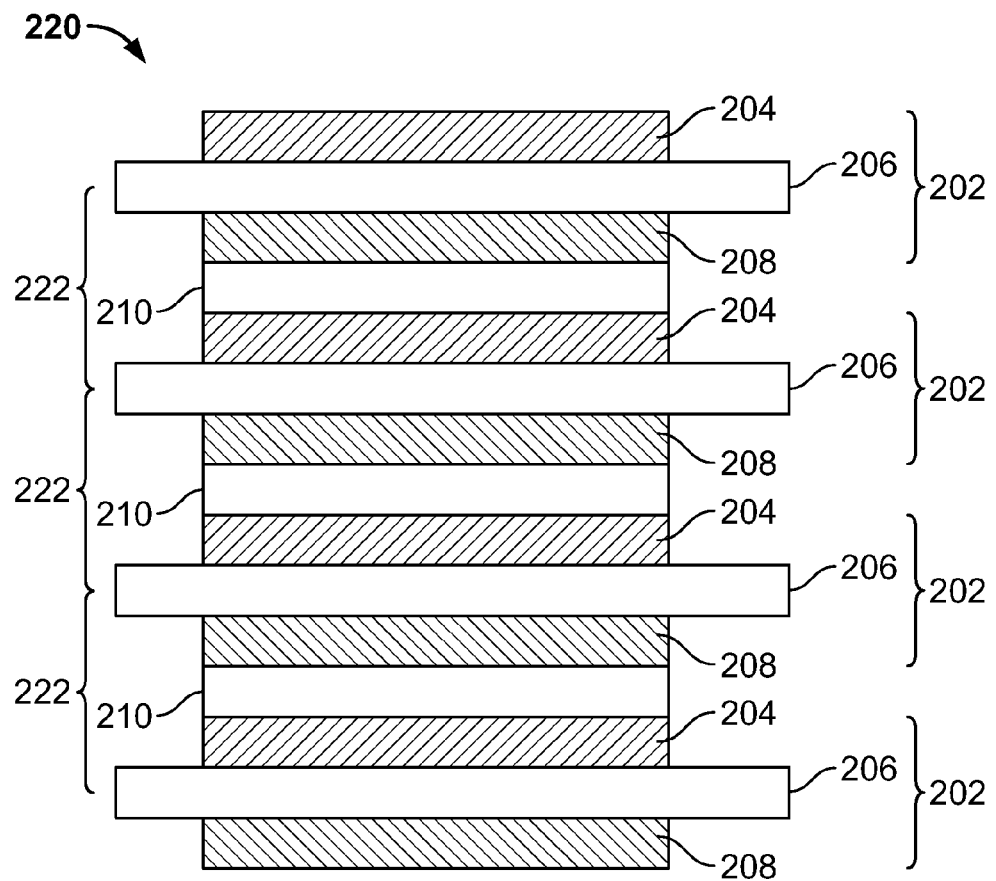
FIG. 2 shows a schematic cross-sectional view of a structure of a stack of BPUs of FIG. 1 according to an embodiment of the invention.

As shown in FIG. 2, for example, multiple BPUs 202 may be stacked substantially vertically into a stack 220, with an electrolyte layer 210 that may be provided between two adjacent BPUs 202, such that positive electrode layer 204 of one BPU 202 may be opposed to negative electrode layer 208 of an adjacent BPU 202 via electrolyte layer 210. Each electrolyte layer 210 may include a separator that may hold an electrolyte. The separator may electrically separate the positive electrode layer 204 and negative electrode layer 208 adjacent thereto, while allowing ionic transfer between the electrode units.

With continued reference to the stacked state of BPUs 202 in FIG. 2, for example, the components included in positive electrode layer 204 and substrate 206 of a first BPU 202, the negative electrode layer 208 and substrate 206 of a second BPU 202 adjacent to the first BPU 202, and the electrolyte layer 210 between the first and second BPUs 202 shall be referred to herein as a single "cell" or "cell segment" 222. Each impermeable substrate 206 of each cell segment 222 may be shared by the applicable adjacent cell segment 222.

Figure 3:
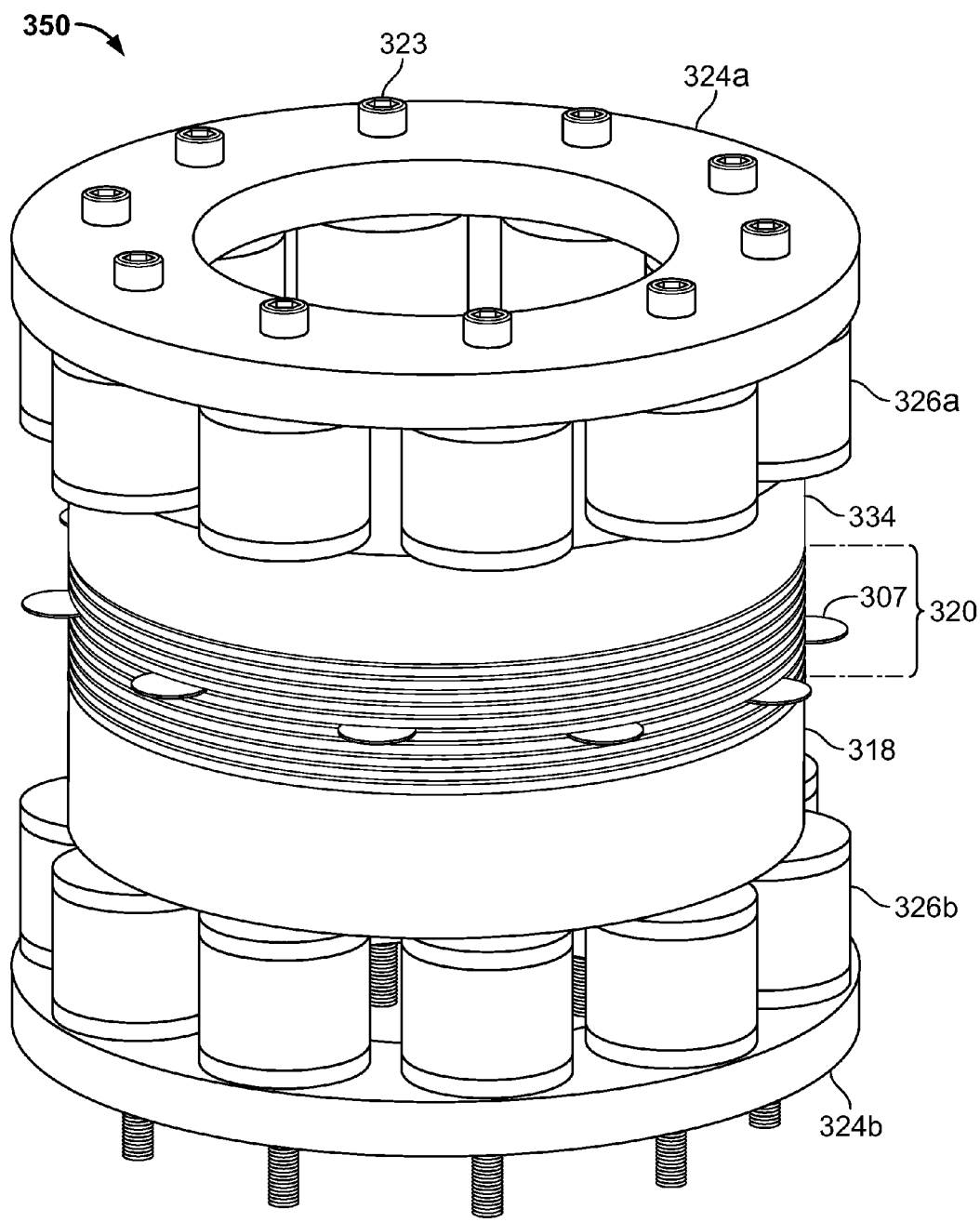
FIG. 3 shows a perspective view of a stacked bi-polar ESD according to an embodiment of the invention.
Figure 4:
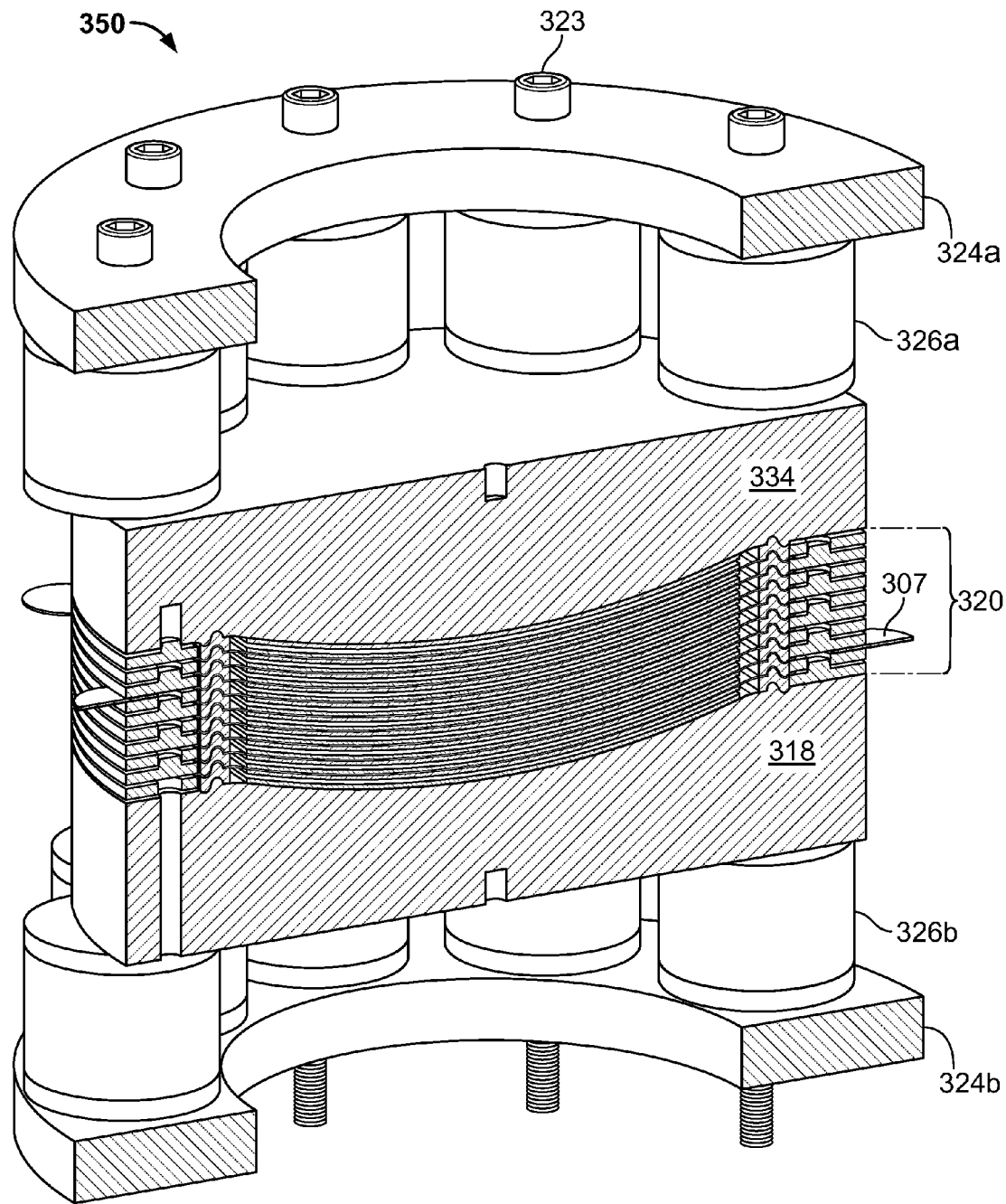
FIG. 4 shows a partial cross-sectional view of the stacked bi-polar ESD of FIG. 3 according to an embodiment of the invention.

FIGS. 3 and 4 show a perspective view and a partial cross-sectional view, respectively, of a stacked bi-polar ESD according to an embodiment of the present invention. Stacked bi-polar ESD 350 may include compression bolts 323, alignment rings 324a and 324b, mechanical springs 326a and 326b, stack 320 (including substrate flanges 307), and rigid end caps 334 and 318 provided at either end of stack 320. Alignment rings 324 may be provided at either end of stacked bi-polar ESD 350. For example, alignment ring 324a and alignment ring 324b may be provided at opposing ends of ESD 350. Mechanical springs may be provided between alignment rings 324a/324b and rigid end caps 334/318. For example, mechanical springs 326a may be provided between alignment ring 324a and rigid end cap 334 and mechanical springs 326b may be provided between alignment ring 324b and rigid end cap 318. Mechanical springs 326a and 326b may be configured to deflect in response to forces generated during operation and cycling of ESD 350. In some embodiments, deflection of springs 326a and 326b may be directly proportional to the applied load.

Figure 5:
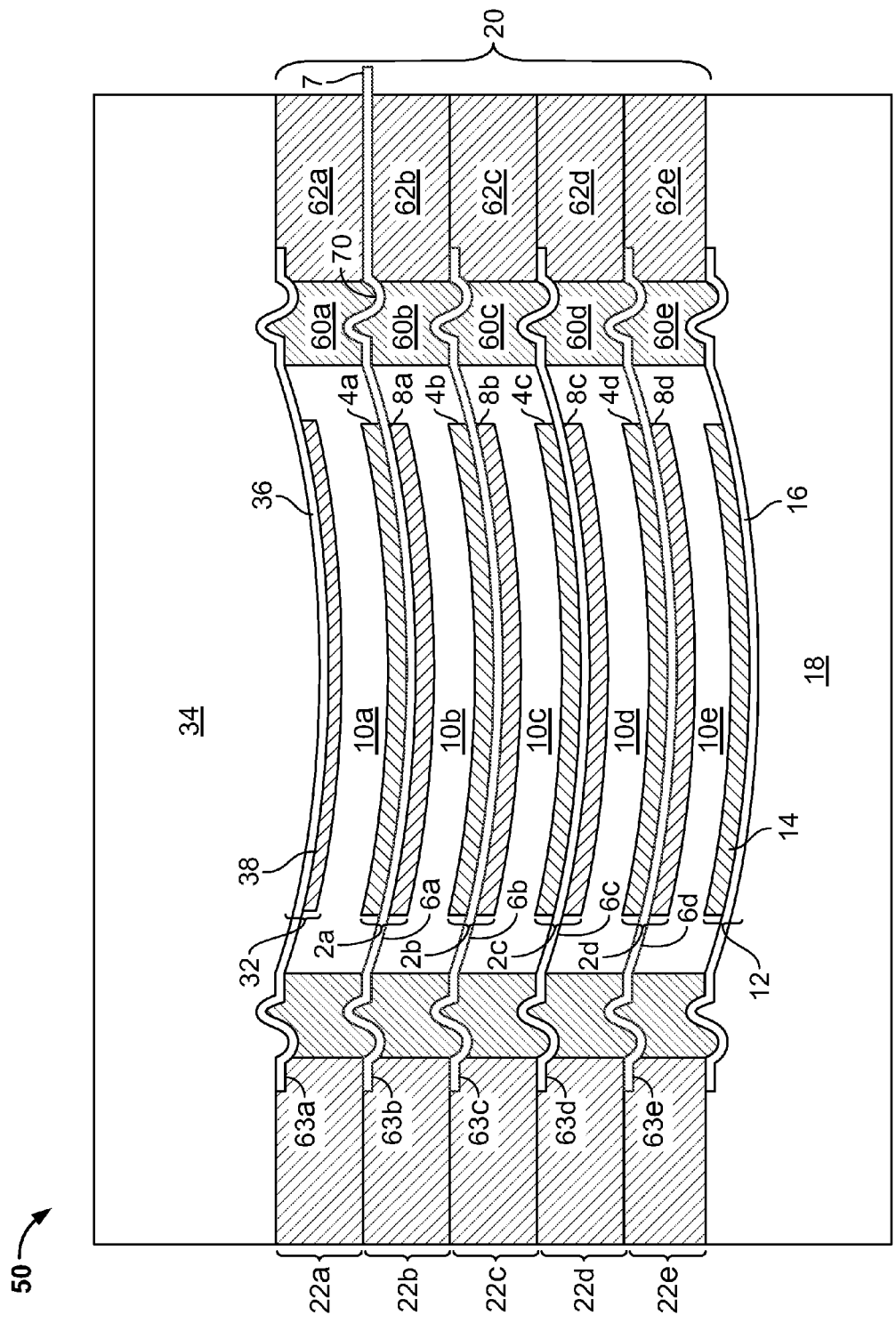
FIG. 5 shows a schematic cross-sectional view of the stacked bi-polar ESD of FIG. 4 according to an embodiment of the invention.

Rigid end caps 334 and 318 may be shaped to substantially conform to the shape of the electrodes of bi-polar ESD 350 (see, e.g., BPUs 2a-d of FIG. 5). For example, end caps 334 and 318 may conform to the "flat plate," "dish-shaped," or any other shape, or combinations thereof, of the electrodes and/or substrates of ESD 350.

In some embodiments, substrate flanges 307 may be provided about bi-polar ESD 350 and may extrude radially outwardly from stack 320. Flange 307 may provide, for example, an electrical connection to a bi-polar electrode unit corresponding to the respective impermeable conductive substrate to which flange 307 is coupled (see, e.g., flange 7 of BPU 2a of FIG. 5). Although flange 307 of FIG. 3 is shaped as a "tongue depressor," it may be any other suitable shape, and of any other suitable size, configured to extend outwardly from stack 320. For example, the cross-sectional area of flange 307 may be substantially rectangular, triangular, circular or elliptical, hexagonal, or any other desired shape or combination thereof, and may be configured to electrically couple with a particular connector or connectors.

FIG. 5 shows a schematic cross-sectional view of the stacked bi-polar ESD of FIG. 4 according to an embodiment of the invention. End caps 18 and 34 may be provided at a first end and a second end, respectively, of stack 20. As shown in FIG. 5, for example, positive and negative terminals may be provided along with the stack 20 of one or more BPUs 2a-d to constitute a stacked bi-polar ESD 50 in accordance with an embodiment of the invention. A positive mono-polar electrode unit or MPU 12, that may include a positive active material electrode layer 14 provided on one side of an impermeable conductive substrate 16, may be positioned at a first end of stack 20 with an electrolyte layer provided (i.e., electrolyte layer 10e), such that positive electrode layer 14 of positive MPU 12 may be opposed to a negative electrode layer (i.e., layer 8d) of the BPU (i.e., BPU 2d) at that first end of stack 20 via the electrolyte layer 10e. A negative mono-polar electrode unit or MPU 32, that may include a negative active material electrode layer 38 provided on one side of an impermeable conductive substrate 36, may be positioned at the second end of stack 20 with an electrolyte layer provided (i.e., electrolyte layer 10a), such that negative electrode layer 38 of negative MPU 32 may be opposed to a positive electrode layer (i.e., layer 4a) of the BPU (i.e., BPU 2a) at that second end of stack 20 via the electrolyte layer 10a. MPUs 12 and 32 may be respectively provided with corresponding positive and negative electrode leads (not shown).

It should be noted that the substrate and electrode layer of each MPU may form a cell segment with the substrate and electrode layer of its adjacent BPU 2a/2d, and the electrolyte layer 10a/10e therebetween, as shown in FIG. 5, for example (see, e.g., segments 22a and 22e). The number of stacked BPUs 2a-d in stack 20 may be one or more, and may be appropriately determined in order to correspond, for example, to a desired voltage for ESD 50. Each BPU 2a-d may provide any desired potential, such that a desired voltage for ESD 50 may be achieved by effectively adding the potentials provided by each component BPU 2a-d. It will be understood that each BPU 2a-d need not provide identical potentials.

In some embodiments, bi-polar ESD 50 may be structured so that BPU stack 20 and its respective positive and negative MPUs 12 and 32 may be at least partially encapsulated (e.g., hermetically sealed) into a case or wrapper under reduced pressure. MPU conductive substrates 16 and 36 may be drawn out of the ESD case, so as to mitigate impacts from the exterior upon usage and to prevent environmental degradation, for example.

In some embodiments of the present invention, bi-polar ESD 50 may be structured so that end cap 18 or end cap 34, or both, may be an impermeable conductive substrate, and active material electrode layers 14 and 38 may be provided directly on one side of end caps 18/34. In this embodiment, for example, there may not be a need for impermeable conductive substrates 16/36 because positive MPU 12 may include positive active material electrode layer 14 provided on one side of end cap 18 (not shown), and negative MPU 32 may include negative active material electrode layer 38 provided on one side of end cap 34 (not shown).

In order to prevent electrolyte of a first cell segment (see, e.g., electrolyte layer 10a of cell segment 22a) from combining with the electrolyte of another cell segment (see, e.g., electrolyte layer 10b of cell segment 22b), dynamic flexible gaskets or seals may be stacked with the electrolyte layers between adjacent electrode units to substantially seal electrolyte within its particular cell segment. A gasket or sealant may be any suitable compressible or incompressible solid or viscous material, any other suitable material, or combinations thereof, for example, that may mechanically interact with adjacent electrode units of a particular cell to seal electrolyte therebetween. In one suitable arrangement, as shown in FIG. 5, for example, the bi-polar ESD of the invention may include gaskets or seals 60a-e that may be positioned as a barrier about electrolyte layers 10a-e and active material electrode layers 4a-d/14 and 8a-d/38 of each cell segment 22a-e. The gasket or sealant may be continuous and closed and may substantially seal electrolyte between the gasket and the adjacent electrode units of that cell (i.e., the BPUs or the BPU and MPU adjacent to that gasket or seal). The gasket or sealant may provide appropriate spacing between the adjacent electrode units of that cell, for example.

In sealing the cell segments of stacked bi-polar ESD 50 to prevent electrolyte of a first cell segment (see, e.g., electrolyte layer 10a of cell segment 22a) from combining with the electrolyte of another cell segment (see, e.g., electrolyte layer 10b of cell segment 22b), cell segments may produce a pressure differential between adjacent cells (e.g., cells 22a/22b) as the cells are charged and discharged. Equalization valves may be provided to substantially decrease the pressure differences thus arising. Equalization valves may operate as a semi-permeable membrane or rupture disk, either mechanically or chemically, or both, to allow the transfer of a gas and to substantially prevent the transfer of electrolyte. An ESD may have BPUs having any combination of equalization valves. Pressure equalization valves are discussed in more detail in West et. al U.S. patent application Ser. No. 12/258,854, which is hereby incorporated by reference herein in its entirety.

Pressure relief valves may be a mechanical arrangement of a sealing material (e.g., rubber) backed by a rigid material (e.g., steel) that is compressed against an opening in the cell using a spring, or sometimes a compressible rubber slug. When the pressure inside the cell increases beyond acceptable limits, the spring compresses and the rubber seal is pushed away from the opening and the excess gas escapes. Once the pressure is reduced the valve then reseals and the cell is able to function somewhat normally. Excess electrolyte most probably escapes with the released pressure as well.

A gas equalization valve substantially prevents the transport of polar liquids, but may allow diatomic gases and non-reactive or noble gases to diffuse through the valve to equalize pressure on both sides of the valve. The liquids that are blocked from diffusion or transport may include but are not limited to water, alcohol, salt solutions, basic solutions, acidic solutions, and polar solvents. A gas equalization valve may be used to separate diatomic gases from polar liquids. A gas equalization valve made from a polar solvent resistant sealant and a bundle of graphitic carbon fiber may also be used. The gas equalization valve may be used to equalize the pressure between cells in a multiple cell ESD, in a bi-polar cell ESD, or in an ultracapacitor storage device. The gas equalization valve may be used, for example, to control the differential pressure in the ESD of an electric vehicle, hybrid electric vehicle, or a plug-in hybrid electric vehicle having at least one wheel and having a carrying capacity of at least one kilogram.

With continuing reference to FIG. 5, hard stops 62a-e may be provided radially outwardly from gaskets 60a-e. For example, hard stop 62a may be provided radially outwardly from gasket 60a, and hard stop 62a may substantially encircle the contents of cell segment 22a. Each hard stop 62a-e may have a shelf 63a-e on which a substrate (e.g., substrate 6a) may be securely positioned. It will be understood that although gaskets 60a-e are shown as being adjacent to hard stops 62a-e, gaskets 60a-e and hard stops 62a-e may be separated by any suitable gap distance that may allow gaskets 60a-e to expand or deform radially outwardly towards hard stops 62a-e, for example, to reduce the pressure of a given cell.

Figure 6:
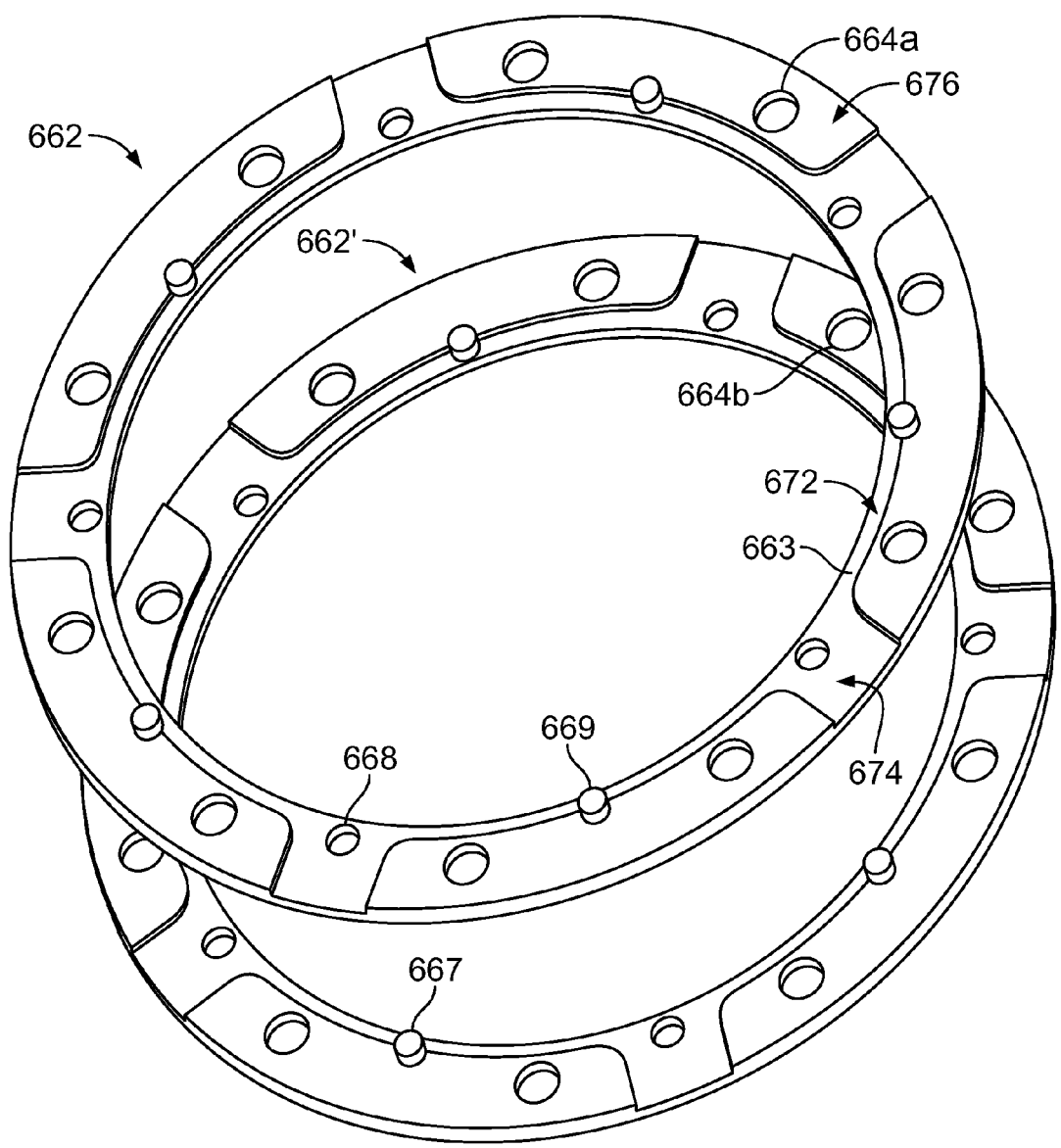
FIG. 6 shows a perspective view of a hard stop of the bi-polar ESD of FIG. 5 according to an embodiment of the present invention.

Referring now to FIG. 6, there is shown a perspective view of two hard stops 662 of the bi-polar ESD of FIG. 5 in accordance with an embodiment of the present invention. As discussed above in connection with FIG. 5, each hard stop 662 may have a shelf 663 on an inner rim 672 of the hard stop 662 on which an impermeable conductive substrate (e.g., substrate 6a of FIG. 5) may be securely positioned. Hard stop 662 may substantially set the inter-electrode spacing of the ESD with shelf 663 on inner rim 672. In some embodiments the height of shelf 663 may vary from cell to cell within a stack as the materials and geometries of the substrates, electrode layers, electrolyte layers, and gaskets may vary along the height of the stack from cell segment to cell segment. The height of shelf 663 may vary, for example, because the various materials and geometries of a particular cell segment may affect the optimal inter-electrode spacing of that cell segment.

Inner rim 672 of hard stop 662 may also include a set of studs (see, e.g., studs 667 and 669) and a set of stud holes (see, e.g., stud hole 668). Stud hole 668 of a first hard stop 662 may couple with a complimentary stud 667 of a second hard stop 662'. The plurality of studs and stud holes of hard stop 662 may aid in aligning a substrate flange (see, e.g., flange 307 of FIG. 3) to the hard stop, for example, by keeping the respective substrate substantially centered on the stacking axis of the stack assembly. Traversing inner rim 672 of hard stop 662, a plurality of alternating studs 669 and stud holes 668 may be provided in a substantially circular pattern.

A set of bolt holes 664a and 664b for a plurality of compression bolts, for example, or any other suitable rigid fasteners, may be provided along outer rim 676 along the periphery of hard stop 662. Bolt holes 664a and 664b may align an entire stack of bi-polar electrode units (see, e.g., BPUs 2a-d of FIG. 5) during assembly, for example, and may provide stability during operation. Bolt holes 664a and 664b may be sized to accommodate a particular compression bolt or any other suitable rigid fastener. While bolt holes 664a and 664b are shown as circular, they may also be substantially rectangular, triangular, elliptical, hexagonal, or any other desired shape or combination thereof.

Hard stop 662 may also include a substrate shelf 674 that may align with a substrate flange (see, e.g., flange 307 of FIG. 3). Substrate shelf 674 may allow a flange to protrude radially outwardly from a stack (e.g., stack 20 of FIG. 5) through hard stop 662 to allow the flange, for example, to electrically connect to a lead. Although hard stop 662 shows five substrate shelves 674, any suitable number of shelves 674 may be provided and that number may depend on the particular BPU or BPUs used in the ESD.

Figure 7:
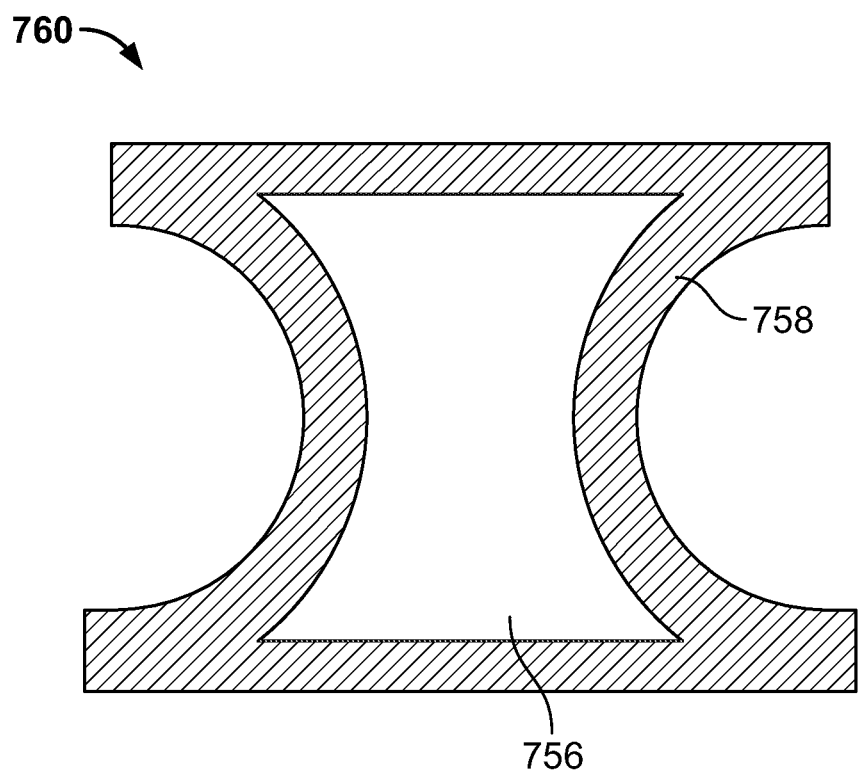
FIG. 7 shows a schematic cross-sectional view of a flexible seal of the bi-polar ESD of FIG. 5 according to an embodiment of the invention.

FIG. 7 shows a schematic cross-sectional view of a dynamic flexible seal or gasket 760 of the bi-polar ESD of FIG. 5 in accordance with an embodiment of the present invention. Flexible gasket 760 may be provided with a first layer 756 and a second layer 758. First layer 756 may be formed of any suitable material or combination of materials that may effectively seal an electrolyte within the space defined by the gasket and the electrode units adjacent thereto. The flexible dynamic seal or gasket may incorporate one or more layers, for example, to improve containment qualities.

Second layer 758 may be a material that is different than the material of first layer 756 or, in some embodiments, it may be the same material. Second layer 758 may be added to first layer 756 using any suitable technique, including being injection molded to first layer 756 such that the two layers may be fused together to create a seal. In certain embodiments, second layer 758 may be ultrasonically welded to first layer 756 such that they may together form a seal. In other embodiments, second layer 758 may be thermally fused to first layer 756, or through heat flow, second layer 758 may be heated to melt into first layer 756.

The dynamic flexible seal or gasket 760 may be configured to physically adjust dimensions while substantially maintaining containment. As discussed above, in some embodiments, seal 760 may incorporate one or more layers, for example, to improve containment qualities.

Containment design for ESDs may incorporate a dynamic containment feature that may physically adjust dimensions to reduce, for example, stresses caused by the active materials of the ESD cycling between thermodynamic states. To reduce the stresses imparted on the container by the contents, for example, the container may be configured to deform in preferred arrangements. A device that may be incorporated to allow containment stress reduction may be a flexible dynamic seal or gasket (e.g., gasket 760).

The gasket may be capable of substantially confining and/or isolating the contents within the container over a preferred service period or service life. Service life may be as long as 15 years or more (e.g, in vehicle applications) and as short as one year or less, for example, depending upon the application. Operating conditions such as temperature, charge and discharge rate, charge procedure, and depth of discharge may affect the service life of the ESD. For example, the service life for a hybrid-electric vehicle (HEV) ESD or a plug-in hybrid-electric vehicle (PHEV) ESD, operating at a certain percentage of the full energy available in the ESD, may be relatively longer than a pure electric vehicle (EV) ESD, which may have repetitive cycles of charging/discharging substantially all of the available energy and/or capacity of the EV ESD. An ESD operated in a relatively hot or cold environment may have a shorter service life than an ESD operated in a more moderate environment. For example, ESDs having space and satellite applications may have a relatively shorter service life than other applications due to environmental considerations (e.g., heaters may be required for operation due to the low temperatures in space).

As part of the containment device, the gasket may be capable of isolating contents within the ESD from internal and/or external contamination. Containment preferably maintains substantially complete isolation and zero to tolerable permeability rates of the contents through the dynamic flexible seal or gasket material. Containment may be described in terms of transmission/permeation properties. Equation 1, below, provides a relationship that may be used to describe behavior of mass permeation rates through a given material:

$$Q = \frac{PA\Delta p}{d} \quad \text{[Eqn. 1]}$$

where Q is the mass flow rate, P is the permeability constant, A is the contact surface area, and Δp is the pressure difference across the path length thickness (d). For behavior consistent with Eqn. 1, a low permeability constant (P) may be preferable.

Multiple constituents may be present within a given container, and each constituent may coexist in multiple phases (e.g., solid, liquid, and gas phases) depending upon environmental conditions. The coexistence of multiple constituents, potentially having multiple phases, may lead to variations in gasket performance. For example, the permeation constant may vary by constituent and/or the state or states of the constituent. Incorporating additional layers to the base gasket material (see, e.g., first layer 756 and second layer 758 of FIG. 7) may be one of any suitable number of techniques to improve containment. Materials that may be used for the flexible dynamic seal or gasket may include polymers, metals, ceramics, any other material, or suitable combinations thereof.

In an embodiment, a flexible dynamic seal or gasket may be employed in a bi-polar ESD having nickel-metal hydride (NiMH) chemistry. In this application the gasket may mechanically adjust dimensions while maintaining a substantially sealed contact with the adjoining surfaces. To mechanically deform, the seal may include a material that is capable of elastic mechanical deformation. Some materials that may be employed may include certain polymers, ceramics, and metals, or any other suitable material, or combinations thereof. A preferred base material for the bi-polar metal hydride embodiment may be elastomers, such as Buna N rubbers, or other suitable nitrile rubbers. A material may be sufficient as long as the elastic limits of mechanical deformation are not exceeded during operation.

In the example of a bi-polar metal hydride energy storage device, there may be a plurality of permeates (e.g., hydrogen, oxygen, water, water vapor) that may be considered when selecting and/or designing the flexible dynamic seal or gasket. Because there may be a plurality of permeates, a homogenous seal or gasket may not be preferable to substantially contain all permeates. Therefore, in certain embodiments, adding layers to the gasket may be preferable.

A permeate of relative importance to the function of a bi-polar metal hydride ESD, for example, may be hydrogen gas. During operation of the ESD, hydrogen gas pressure may be relatively significant, and the incorporation of an additional layer or additional layers to a base seal or gasket material may substantially reduce the hydrogen gas permeation rates that would potentially occur through a seal or gasket including only a single layer. The gasket layers may include metallic foils and/or metallic foils with catalytic recombination properties (e.g., to catalyze oxygen and hydrogen to form water).

As discussed above, the flexible dynamic seal or gasket may be configured to deform in a preferred direction or preferred directions. The direction of deformation may be along an axial or radial direction of the seal or gasket itself, which may or may not be the same directions as the axial and radial directions of the ESD stack. Further, the seal or gasket may be configured to deform along one axis or multiple axes.

Figure 8:
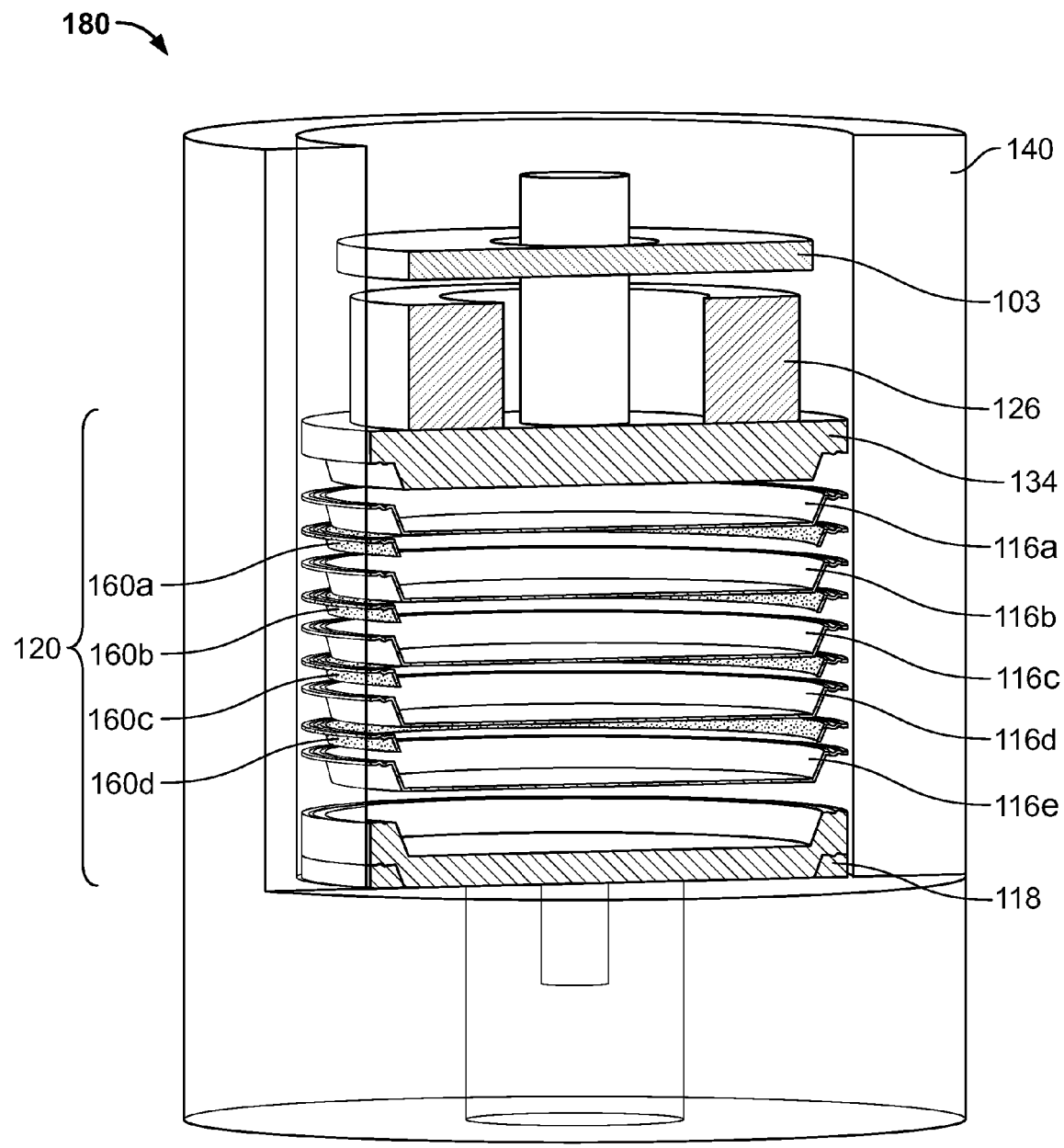
FIG. 8 shows a partially-exploded schematic cross-sectional view of a stacked bi-polar ESD according to an embodiment of the invention.

FIG. 8 shows a partially-exploded schematic cross-sectional view of a stacked bi-polar ESD according to an embodiment of the invention. As shown in FIG. 8, for example, compression plate 103, springs 126, and stack 120 may be substantially enclosed in a dynamic containment vessel 140. Stack 120 may include end caps 134 and 118, impermeable conductive substrates or current collectors 116a-e, and flexible dynamic seals or gaskets 160a-d provided between each conductive substrate 116a-e. Various components of stack 120 have been omitted in order to highlight certain aspects of ESD 180. For example, it will be understood that each bi-polar unit of ESD 180 may include a positive active material electrode layer (see, e.g., positive electrode layer 104 of FIG. 1) that may be provided on a first side of conductive substrates 116a-e, and a negative active material electrode layer (see, e.g., negative electrode layer 108 of FIG. 1) that may be provided on the other side of conductive substrates 116a-e.

In certain embodiments of the invention, in order to create a relatively better seal, one or more portions of the surface area of the gasket and the surface area of an adjacent electrode unit that contact each other may each be reciprocally or correspondingly grooved, chamfered, or shaped. At least a portion of a surface of a gasket may be shaped correspondingly to at least a portion of a surface of an electrode unit (see, e.g., groove 70 between gasket 60a and substrate 6a of FIG. 5) such that the two surfaces may mate together to restrict certain types of relative movement between the two surfaces and to self-align the gasket and the electrode unit during the manufacture of the ESD, for example. This groove formed by the mating of reciprocally shaped portions of a gasket and adjacent substrate, for example, may thereby increase the size of their mated contact area and may thereby provide a larger path of resistance for any fluid (e.g., electrolyte) attempting to break the seal created between the mated contact area of the gasket and substrate. Gasket grooves are discussed in more detail in Ogg et al. U.S. patent application Ser. No. 12/069,793, which is hereby incorporated by reference herein in its entirety.

In some embodiments, stacked bi-polar ESD 180 may be designed to allow movement along a preferred direction. This may be accomplished, for example, using any one of containment vessel 140, gaskets 160a-d, springs 126, and end caps 134/118, or any other suitable components, or any combinations thereof. For example, dynamic containment vessel 140 may be designed to permit physical expansion but may limit movement to only the stacking direction. As the active materials of each cell segment undergo volume changes during cycling, for example, and gases are generated and/or consumed, containment vessel 140 may prevent the cells from expanding radially while gaskets 160a-d may expand along the stacking direction. During expansion and/or contraction, containment vessel 140 and gaskets 160a-d may substantially contain the cell components (e.g., the positive and negative active materials, electrolyte, and/or various gases). Thus, in some embodiments, an ESD may provide variable volume containment without using hard stops (see, e.g., hard stop 662 of FIG. 6). However, it will be appreciated that in some embodiments hard stops may be added to ESD 180.

Figure 9:
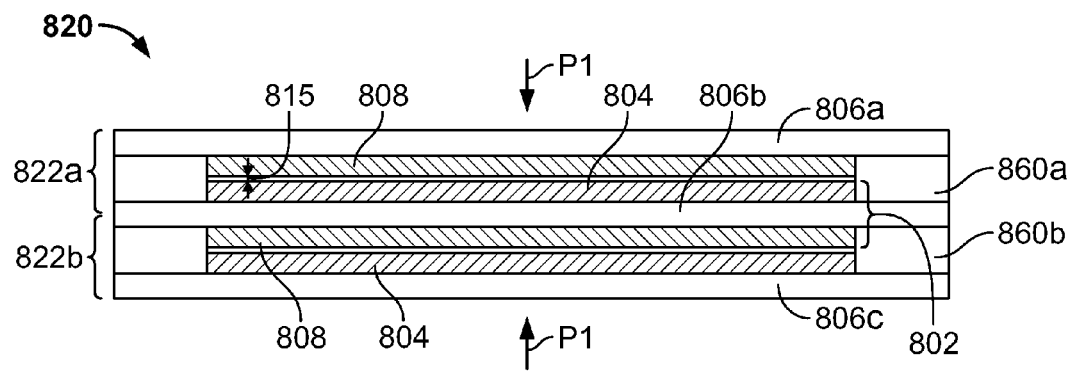
FIG. 9 shows a schematic cross-sectional view of a structure of a stacked bi-polar ESD according to an embodiment of the invention.

FIG. 9 shows a schematic cross-sectional view of a structure of a stack 820 of two cell segments 822a and 822b of a bi-polar ESD according to an embodiment of the invention. As shown in FIG. 9, for example, each cell segment 822a/

822*b* may include a gasket 860*a*/860*b*, a positive active material electrode layer 804, and a negative active material electrode layer 808 with an electrolyte layer provided therebetween. Impermeable conductive substrate or current collector 806*c* may be at a first end of stack 820, and conductive substrate 806*a* may be at a second end of stack 820. A stacking direction may be defined, using conductive substrates 806*c* and 806*a*, as the direction from the first end of stack 820 to the second end of stack 820. With continued reference to the stacked state of FIG. 9, for example, the components between and including conductive substrate 806*a* and conductive substrate 806*b* may be included in cell segment 822*a*. Similarly, the components between and including conductive substrate 806*b* and conductive substrate 806*c* may be included in cell segment 822*b*. BPU 802 may include positive electrode layer 804 that may be provided on a first side of conductive substrate 806*b* and negative electrode layer 808 that may be provided on the other side of conductive substrate 806*b*.

In the stack of FIG. 9, for example, positive electrode layer 804 and negative electrode layer 808 may be separated by a gap distance 815. Gap distance 815 may be any suitable distance that minimizes internal resistance while restricting electron transport between electrode surfaces. For example, suitable gap distances may be design specific and may be 0 mils, 5 mils, 10 mils, or greater. Gap distances may be related, for example, to the closing force of the ESD assembly, electrode thickness, and electrode loading of active materials. In some embodiments, for example, to increase the ESD capacity of stack 820, positive electrode layer 804 and/or negative electrode layer 808 may be thickened so that gap distance 815 may be relatively small, for example, compared to the gap distance between positive electrode layer 204 and negative electrode layer 208 of FIG. 2. Increasing the ESD capacity using various electrode configurations is discussed in more detail in West et al. U.S. patent application Ser. No. 12/694,641, filed Jan. 27, 2010, which is hereby incorporated by reference herein in its entirety.

Figure 10:
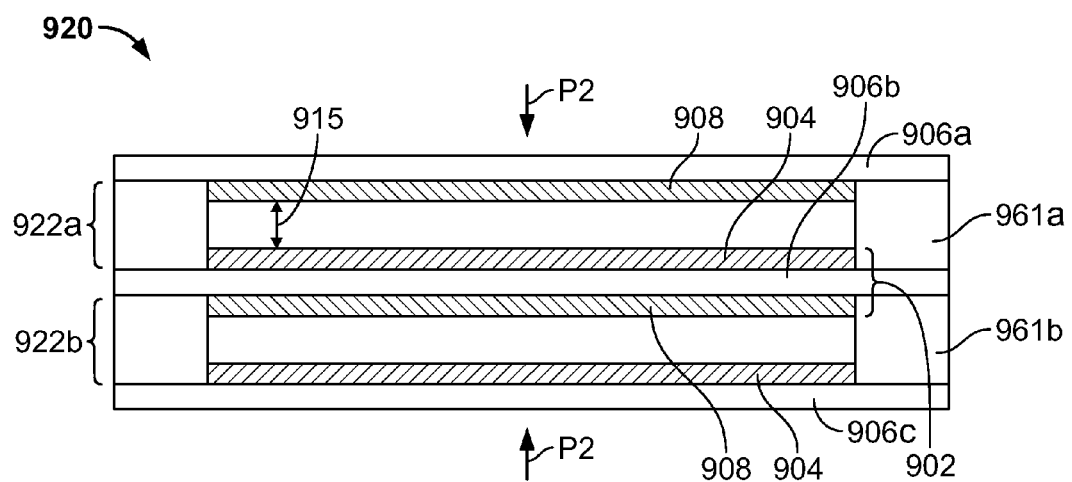
FIG. 10 shows a schematic cross-sectional view of a structure of a stacked bi-polar ESD according to an embodiment of the invention.

FIG. 10 shows a schematic cross-sectional view of a structure of the stacked bi-polar ESD of FIG. 9 having gaskets 961*a* and 961*b* that may be over-extended along a single axis in the stacking direction according to an embodiment of the invention. As previously discussed, the pressure within a fixed volume container may be proportional to the amount and state or states of the active materials within the fixed volume container (e.g., active material electrode layers 904 and 908). In an ESD using gaskets 961*a* and 961*b*, an increase in pressure may cause an undesirable increase in the inter-electrode spacing within a cell segment of stack 920. For example, in response to an increase in pressure (e.g., pressure P2 of FIG. 10 may be greater than pressure P1 of FIG. 9) that may develop inside cell segment 922*a*, gap distance 915 between positive electrode layer 904 and negative electrode layer 908 may increase as gasket 960*a* expands in the stacking direction. The change in the inter-electrode spacing of the ESD configuration of FIG. 10 may be undesirable because of the relatively large increase in gap distance 915, compared to gap distance 815 of FIG. 9, which may cause undesirable cascading effects, such as increased electrical impedance and decreased charge efficiency, discharge capacity, and rate capability, for example.

Figure 11:
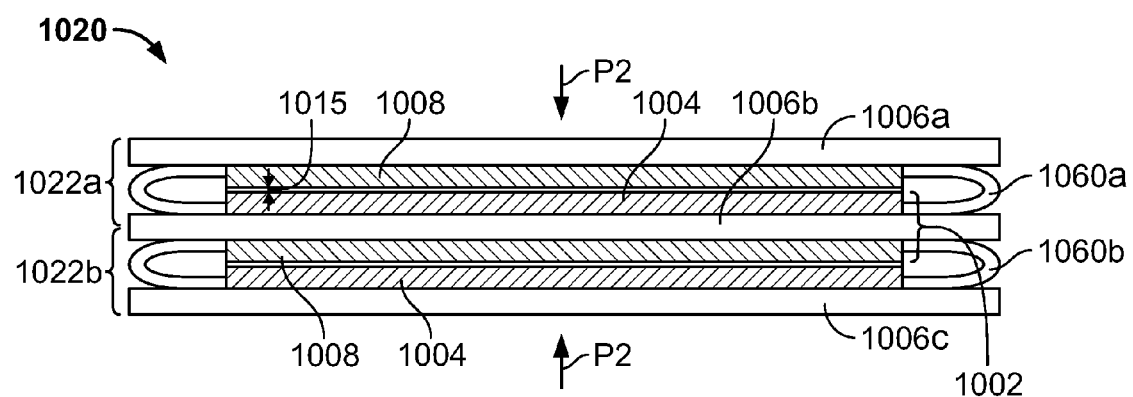
FIG. 11 shows a schematic cross-sectional view of a structure of a stacked bi-polar ESD according to an embodiment of the invention.

FIG. 11 shows a schematic cross-sectional view of a structure of the stacked bi-polar ESD of FIG. 9 having dynamic flexible seals or gaskets 1060*a* and 1060*b* according to an embodiment of the invention. Gaskets 1060*a* and 1060*b* may substantially maintain the inter-electrode spacing of cell segments 1022*a* and 1022*b* of stack 1020 by deforming in a preferred direction or directions. For example, gasket 1060*a* may deform in a direction that is radially outwardly from the stacking direction of stack 1020. By deforming in a radially outwardly direction, gasket 1060*a* may decrease the pressure within cell segment 1022*a* by increasing the volume of cell segment 1022*a* and maintaining a substantially constant gap distance 1015 between positive electrode layer 1004 and negative electrode layer 1008 (i.e., a gap distance that is substantially the same as original gap distance 815 of FIG. 9). It will be understood that in some embodiments, gasket 1060*a* may deform in such a manner that gap distance 1015 may remain substantially constant throughout the operation of the ESD. In other embodiments, gasket 1060*a* may deform in such a manner that gap distance 1015 may vary; however, gap distance 1015 may vary substantially less than gap distance 915 of FIG. 10 given the same pressure P2 in both ESDs.

In some embodiments, gasket 1060*a* may deform in other preferred directions. For example, gasket 1060*a* may deform in an off-axis direction (e.g., an axis that is neither in the stacking direction nor radially outwardly from the stacking direction). In other embodiments, gasket 1060*a* may deform in response to conditions other than an increase in pressure within a cell segment. For example, gasket 1060*a* may be designed to deform in a preferred direction in response to various temperature conditions within cell segment 1022*a*. As another example, gasket 1060*a* may be designed to deform in a preferred direction in response to a change in volumetric size of an active material electrode layer (see, e.g., positive electrode layer 1004).

Figure 12:
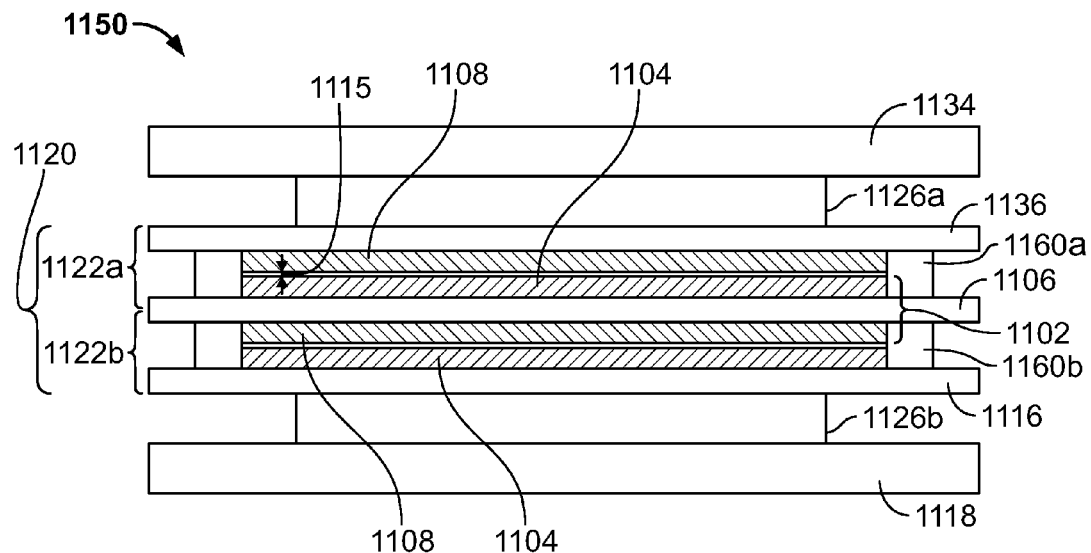
FIG. 12 shows a schematic cross-sectional view of a structure of a stacked bi-polar ESD according to an embodiment of the invention.

FIG. 12 shows a schematic cross-sectional view of a structure of a stacked bi-polar ESD according to an embodiment of the invention. As shown in FIG. 12, for example, each cell segment 1122*a*/1122*b* may include a gasket 1160*a*/1160*b*, a positive active material electrode layer 1104, and a negative active material electrode layer 1108 with an electrolyte layer provided therebetween. Impermeable conductive substrate or current collector 1116 may be at a first end of stack 1120, and impermeable conductive substrate or current collector 1136 may be at a second end of stack 1120. A stacking direction may be defined, using conductive substrates 1116 and 1136, as the direction from the first end of stack 1120 to the second end of stack 1120. With continued reference to the stacked state of FIG. 12, for example, the components between and including conductive substrate 1136 and conductive substrate 1106 may be included in cell segment 1122*a*. Similarly, the components between and including conductive substrate 1106 and conductive substrate 1116 may be included in cell segment 1122*b*. BPU 1102 may include positive electrode layer 1104 that may be provided on a first side of conductive substrate 1106 and negative electrode layer 1108 that may be provided on the other side of conductive substrate 1106.

With continuing reference to FIG. 12, rigid end caps 1134 and 1118 may be provided at the ends of stacked bi-polar ESD 1150. In some embodiments of the present invention, mechanical springs 1126*a*/1126*b* may be provided between rigid end caps 1134/1118 and conductive substrates 1136/1116 of stack 1120. For example, mechanical spring 1126*a* may be provided between rigid end cap 1134 and conductive substrate 1136, and mechanical spring 1126*b* may be provided between rigid end cap 1118 and conductive substrate 1116. In some embodiments of the present invention, mechanical springs 1126*a*/1126*b* may be provided between end caps 1134/1118 and an alignment ring (see, e.g., mechanical springs 326*a* and 326*b* of FIG. 3). It will be understood that mechanical springs 1126*a* and 1126*b* may be provided in any suitable location as described above, or in multiple locations, or may not be provided at all.

Figure 13:
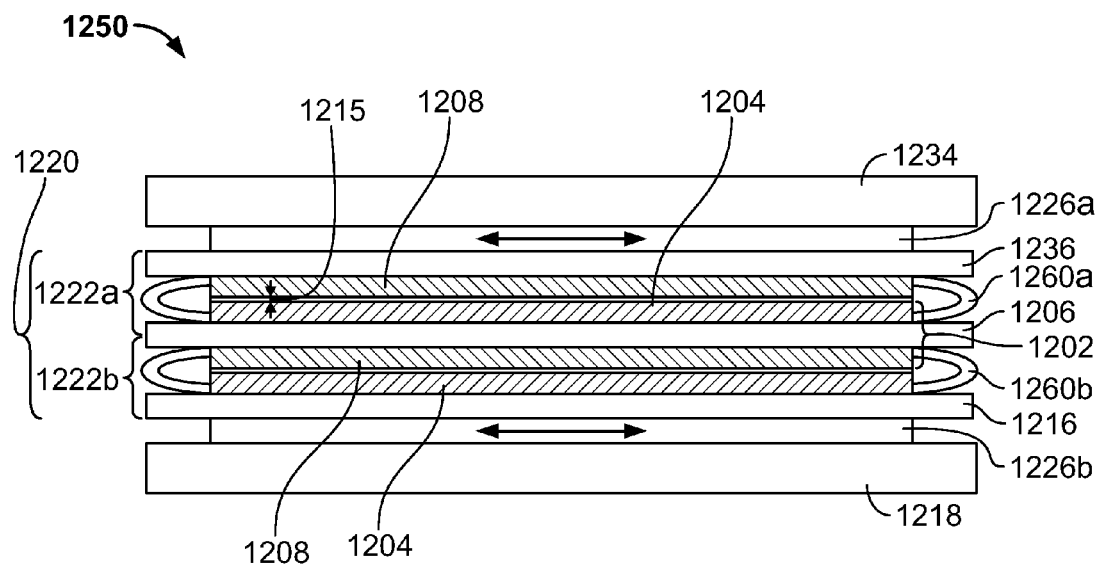
FIG. 13 shows a schematic cross-sectional view of a structure of a stacked bi-polar ESD according to an embodiment of the invention.

FIG. 13 shows a schematic cross-sectional view of a structure of the stacked bi-polar ESD of FIG. 12 having a dynamic flexible seals or gaskets 1260a and 1260b and mechanical springs 1226a and 1226b according to an embodiment of the invention. As discussed above in connection with FIG. 11 (see, e.g., gasket 1060a), gaskets 1260a and 1260b may substantially maintain the inter-electrode spacing of cell segments 1222a and 1222b of stacked bi-polar ESD 1250 by deforming in a preferred direction or directions. For example, gasket 1260a may deform in a direction that is radially outwardly from the stacking direction of stack 1220. By deforming in a radially outwardly direction, gasket 1260a may decrease the pressure within cell segment 1222a by increasing the volume of cell segment 1222a and maintaining a substantially constant gap distance 1215 between positive electrode layer 1204 and negative electrode layer 1208. Mechanical springs 1226a and 1226b may also substantially maintain the inter-electrode spacing of cell segments 1222a and 1222b of stacked bi-polar ESD 1250. For example, springs 1226a and 1226b may compress in response to an applied load to relieve pressures within stack 1120 of bi-polar ESD 1150.

Stacked bi-polar ESD 1250 of FIG. 13 may include hard stops (not shown) to substantially maintain the inter-electrode spacing of cell segments 1222a and 1222b. For example, hard stops may set the inter-electrode spacing of the ESD using a shelf on the inner rim of the hard stop (see, e.g., shelf 663 on inner rim 672 of FIG. 6). It will be understood that any component discussed above, including dynamic flexible seals or gaskets 1260a and 1260b, mechanical springs 1226a and 1226b, and hard stops, or any other suitable component, or combinations thereof, may operate individually or together to substantially maintain the inter-electrode spacing of a stacked bi-polar ESD.

While the present invention has been described herein in the context of a stacked bi-polar ESD having variable volume containment, the concepts discussed are applicable to any intercellular electrode configuration including, but not limited to, parallel plate, prismatic, folded, wound and/or bi-polar configurations, any other suitable configuration, or any combinations thereof.

Figure 14:
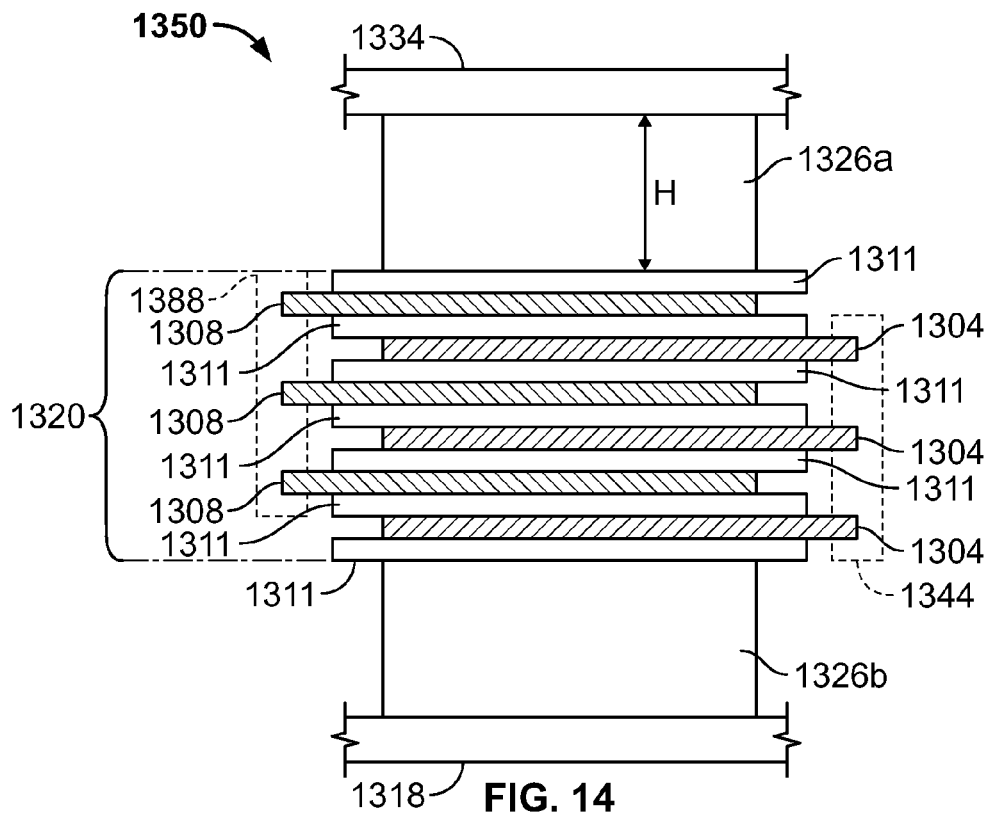
FIG. 14 shows a schematic cross-sectional view of a structure of a prismatic cell ESD according to an embodiment of the invention.

For example, FIG. 14 shows a schematic cross-sectional view of a structure of a prismatic cell ESD according to an embodiment of the invention. ESD 1350 may include a series of alternating positive active material electrode layers 1304 and negative active material electrode layers 1308 stacked with electrically insulating separators 1311 provided therebetween to form stack 1320. This arrangement of electrode layers may provide, for example, a relatively high diffusion area between opposing electrodes. The alternating positive electrode layers 1304 and negative electrode layers 1308 may be electrically coupled in parallel via leads at positive region 1344 and negative region 1388. Rigid housing 1334 and 1318 may be provided at the respective ends of stacked ESD 1350 and may substantially seal an electrolyte within ESD 1350. Rigid housing 1334 and 1318 may be formed of any suitable material or combination of materials that may be conductive or non-conductive including, but not limited to, various metals (e.g., steel, aluminum, and copper alloys), polymers, ceramics, any other suitable conductive or non-conductive material, or combinations thereof.

In some embodiments of the present invention, mechanical springs 1326a/1326b may be provided between rigid housing 1334/1318 and a respective separator 1311 of stack 1320. For example, mechanical spring 1326a may be provided between rigid housing 1334 and separator 1311 at a first end of stack 1320, and mechanical spring 1326b may be provided between rigid housing 1318 and separator 1311 at a second end of stack 1320. It will be understood, however, that mechanical springs 1326a and 1326b may be provided in any suitable location as described above, or in multiple locations, or may not be provided at all.

Figure 15:
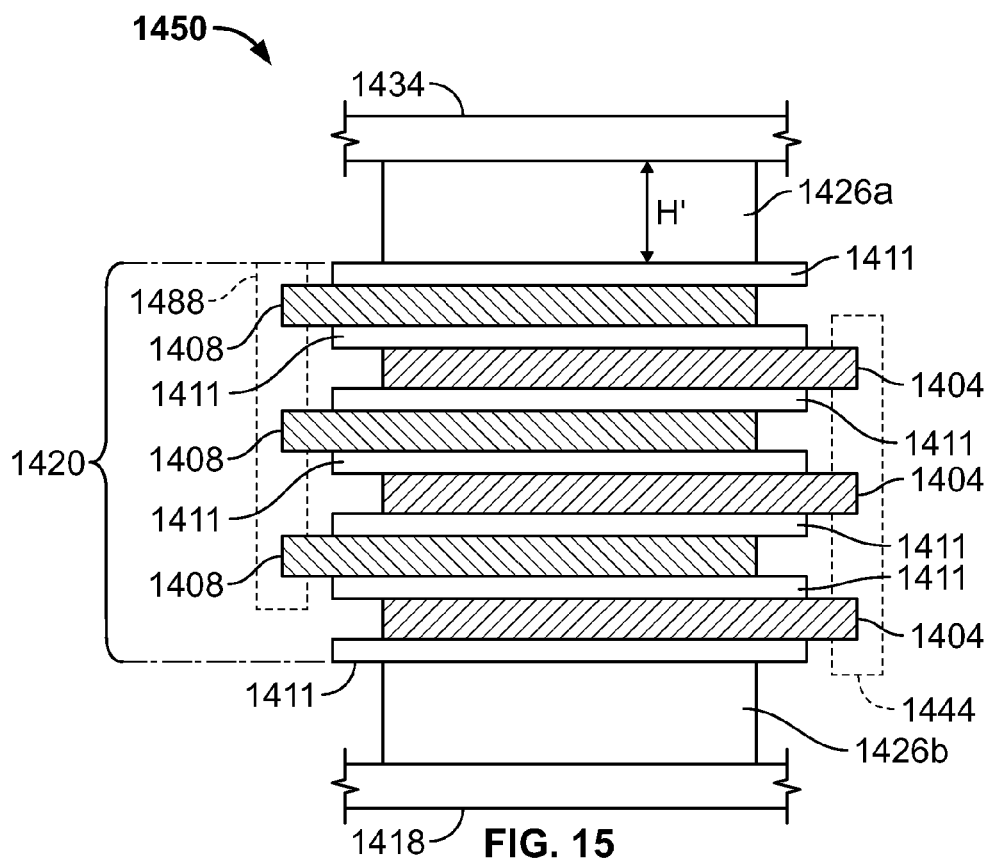
FIG. 15 shows a schematic cross-sectional view of a structure of a prismatic cell ESD according to an embodiment of the invention.

FIG. 15 shows a schematic cross-sectional view of a structure of a prismatic cell ESD according to an embodiment of the invention. ESD 1450 includes rigid housing 1434 and 1418, mechanical springs 1426a and 1426b, electrically insulating separators 1411, positive active material electrode layers 1404 having positive region 1444, and negative active material electrode layers 1408 having negative region 1448. As shown in FIG. 15, for example, in response to an increase in pressure within stack 1420, spring 1426a, or spring 1426b, or both may deflect (e.g., height H' of spring 1426a may be less than height H of spring 1326a) in order to reduce the pressure within stack 1420. As discussed above, an increase in pressure within stack 1420 may be due to, for example, state changes of the active materials (e.g., positive electrode layers 1404 and/or negative electrode layers 1408) during operation of ESD 1450 or while ESD 1450 is at rest.

In some embodiments of the present invention, springs 1426a/1426b may be configured to deflect in response to an increase in pressure within stack 1420 while still maintaining suitable pressure on the layers of stack 1420 (i.e., positive and negative electrode layers 1404 and 1408 and separators 1411) to ensure relatively close contact between adjacent layers. Suboptimal contact between adjacent electrodes may, for example, reduce the overall capacity of ESD 1450 and may lead to other undesirable effects similar to those discussed above in connection with increased gap layers between electrodes of bi-polar ESDs.

The substrates used to form the electrode units of the invention (e.g., substrates 6a-d, 16, and 36) may be formed of any suitable conductive and impermeable or substantially impermeable material, including, but not limited to, a non-perforated metal foil, aluminum foil, stainless steel foil, cladding material including nickel and aluminum, cladding material including copper and aluminum, nickel plated steel, nickel plated copper, nickel plated aluminum, gold, silver, any other suitable material, or combinations thereof, for example. Each substrate may be made of two or more sheets of metal foils adhered to one another, in certain embodiments. The substrate of each BPU may typically be between 0.025 and 5 millimeters thick, while the substrate of each MPU may be between 0.025 and 10 millimeters thick and act as terminals to the ESD, for example. Metalized foam, for example, may be combined with any suitable substrate material in a flat metal film or foil, for example, such that resistance between active materials of a cell segment may be reduced by expanding the conductive matrix throughout the electrode.

The positive electrode layers provided on these substrates to form the electrode units of the invention (e.g., positive electrode layers 4a-d and 14) may be formed of any suitable active material, including, but not limited to, nickel hydroxide $(Ni(OH)_2)$, zinc (Zn), any other suitable material, or combinations thereof, for example. The positive active material may be sintered and impregnated, coated with an aqueous binder and pressed, coated with an organic binder and pressed, or contained by any other suitable technique for containing the positive active material with other supporting chemicals in a conductive matrix. The positive electrode layer of the electrode unit may have particles, including, but not limited to, metal hydride (MH), palladium (Pd), silver (Ag), any other suitable material, or combinations thereof, infused in its matrix to reduce swelling, for example. This may increase cycle life, improve recombination, and reduce pressure within the cell segment, for example. These particles, such as MH, may also be in a bonding of the active material paste, such as Ni(OH)$_2$, to improve the electrical conductivity within the electrode and to support recombination.

The negative electrode layers provided on these substrates to form the electrode units of the invention (e.g., negative electrode layers 8*a-d* and 38) may be formed of any suitable active material, including, but not limited to, MH, Cd, Mn, Ag, any other suitable material, or combinations thereof, for example. The negative active material may be sintered, coated with an aqueous binder and pressed, coated with an organic binder and pressed, or contained by any other suitable technique for containing the negative active material with other supporting chemicals in a conductive matrix, for example. The negative electrode side may have chemicals including, but not limited to, Ni, Zn, Al, any other suitable material, or combinations thereof, infused within the negative electrode material matrix to stabilize the structure, reduce oxidation, and extend cycle life, for example.

Various suitable binders, including, but not limited to, organic carboxymethylcellulose (CMC) binder, Creyton rubber, PTFE (Teflon), any other suitable material, or combinations thereof, for example, may be mixed with the active material layers to hold the layers to their substrates. Ultra-still binders, such as 200 ppi metal foam, may also be used with the stacked ESD constructions of the invention.

The separator of each electrolyte layer of the ESD of the invention may be formed of any suitable material that electrically isolates its two adjacent electrode units while allowing ionic transfer between those electrode units. The separator may contain cellulose super absorbers to improve filling and act as an electrolyte reservoir to increase cycle life, wherein the separator may be made of a polyabsorb diaper material, for example. The separator may, thereby, release previously absorbed electrolyte when charge is applied to the ESD. In certain embodiments, the separator may be of a lower density and thicker than normal cells so that the inter-electrode spacing (IES) may start higher than normal and be continually reduced to maintain the capacity (or C-rate) of the ESD over its life as well as to extend the life of the ESD.

The separator may be a relatively thin material bonded to the surface of the active material on the electrode units to reduce shorting and improve recombination. This separator material may be sprayed on, coated on, pressed on, or combinations thereof, for example. The separator may have a recombination agent attached thereto, in certain embodiments. This agent may be infused within the structure of the separator (e.g., this may be done by physically trapping the agent in a wet process using a polyvinyl alcohol (PVA or PVOH) to bind the agent to the separator fibers, or the agent may be put therein by electro-deposition), or it may be layered on the surface by vapor deposition, for example. The separator may be made of any suitable material or agent that effectively supports recombination, including, but not limited to, Pb, Ag, any other suitable material, or combinations thereof, for example. While the separator may present a resistance if the substrates of a cell move toward each other, a separator may not be provided in certain embodiments of the invention that may utilize substrates stiff enough not to deflect.

The electrolyte of each electrolyte layer of the ESD of the invention may be formed of any suitable chemical compound that may ionize when dissolved or molten to produce an electrically conductive medium. The electrolyte may be a standard electrolyte of any suitable chemical, including, but not limited to, NiMH, for example. The electrolyte may contain additional chemicals, including, but not limited to, lithium hydroxide (LiOH), sodium hydroxide (NaOH), calcium hydroxide (CaOH), potassium hydroxide (KOH), any other suitable material, or combinations thereof, for example. The electrolyte may also contain additives to improve recombination, including, but not limited to, Ag(OH)$_2$, for example. The electrolyte may also contain rubidium hydroxide (RbOH), for example, to improve low temperature performance. In some embodiments of the invention, the electrolyte may be frozen within the separator and then thawed after the ESD is completely assembled. This may allow for particularly viscous electrolytes to be inserted into the electrode unit stack of the ESD before the gaskets have formed substantially fluid tight seals with the electrode units adjacent thereto.

The seals or gaskets of the ESD of the invention (e.g., gaskets 60*a-e*) may be formed of any suitable material or combination of materials that may effectively seal an electrolyte within the space defined by the gasket and the electrode units adjacent thereto. In certain embodiments, the gasket may be formed from a solid seal barrier or loop, or multiple loop portions capable of forming a solid seal loop, that may be made of any suitable nonconductive material, including, but not limited to, nylon, polypropylene, cell gard, rubber, PVOH, any other suitable material, or combinations thereof, for example. A gasket formed from a solid seal barrier may contact a portion of an adjacent electrode to create a seal therebetween.

Alternatively, the gasket may be formed from any suitable viscous material or paste, including, but not limited to, epoxy, brea tar, electrolyte (e.g., KOH) impervious glue, compressible adhesives (e.g., two-part polymers, such as Loctite° brand adhesives made available by the Henkel Corporation, that may be formed from silicon, acrylic, and/or fiber reinforced plastics (FRPs) and that may be impervious to electrolytes), any other suitable material, or combinations thereof, for example. A gasket formed from a viscous material may contact a portion of an adjacent electrode to create a seal therebetween. In some embodiments, a gasket may be formed by a combination of a solid seal loop and a viscous material, such that the viscous material may improve sealing between the solid seal loop and an adjacent electrode unit. Alternatively or additionally, an electrode unit itself may be treated with viscous material before a solid seal loop, a solid seal loop treated with additional viscous material, an adjacent electrode unit, or an adjacent electrode unit treated with additional viscous material, is sealed thereto, for example.

Moreover, in certain embodiments, a gasket or sealant between adjacent electrode units may be provided with one or more weak points that may allow certain types of fluids (i.e., certain liquids or gasses) to escape therethrough (e.g., if the internal pressures in the cell segment defined by that gasket increases past a certain threshold). Once a certain amount of fluid escapes or the internal pressure decreases, the weak point may reseal. A gasket formed at least partially by certain types of suitable viscous material or paste, such as brai, may be configured or prepared to allow certain fluids to pass therethrough and configured or prepared to prevent other certain fluids to pass therethrough. Such a gasket may prevent any electrolyte from being shared between two cell segments that may cause the voltage and energy of the ESD to fade (i.e., discharge) quickly to zero.

As mentioned above, one benefit of utilizing ESDs designed with sealed cells in a stacked formation (e.g., bipolar ESD 50) may be an increased discharge rate of the ESD. This increased discharge rate may allow for the use of certain less-corrosive electrolytes (e.g., by removing or reducing the whetting, conductivity enhancing, and/or chemically reactive component or components of the electrolyte) that otherwise might not be feasible in prismatic or wound ESD designs. This leeway that may be provided by the stacked ESD design to use less-corrosive electrolytes may allow for certain epoxies (e.g., J-B Weld epoxy) to be utilized when forming a seal with gaskets that may otherwise be corroded by more-corrosive electrolytes.

The hard stops of the ESD of the invention (see, e.g., hard stop 662 of FIG. 6) may be formed of any suitable material including, but not limited to, various polymers (e.g., polyethylene, polypropylene), ceramics (e.g., alumina, silica), any other suitable mechanically durable and/or chemically inert material, or combinations thereof. The hard stop material or materials may be selected, for example, to withstand various ESD chemistries that may be used.

The mechanical springs of the invention (see, e.g., mechanical springs 326a and 326b of FIG. 3) may be any suitable spring that may deflect or deform in response to an applied load. For example, the mechanical springs may be designed to deflect in response to particular loads or a particular load threshold. Any suitable type of spring may be used, including compressible springs, such as open-coiled helical springs, variable pitch springs, and torsion springs; or flat springs, or any other suitable spring, or combinations thereof. The spring itself may be any suitable material, including, but not limited to, high carbon steels, alloy steels, stainless steel, copper alloys, any other suitable inflexible or flexible material, or combinations thereof.

The end caps of the present invention (see, e.g., end caps 18 and 36 of FIG. 3) may be formed of any suitable material or combination of materials that may be conductive or non-conductive, including, but not limited to various metals (e.g., steel, aluminum, and copper alloys), polymers, ceramics, any other suitable conductive or non-conductive material, or combinations thereof.

A case or wrapper of the ESD of the invention, or a dynamic containment vessel (see, e.g., dynamic containment vessel 140), may be provided, and may be formed of any suitable nonconductive material that may seal to the terminal electrode units (e.g., MPUs 12 and 32) for exposing their conductive substrates (e.g., substrates 16 and 36) or their associated leads (not shown). The wrapper may also be formed to create, support, and/or maintain the seals between the gaskets and the electrode units adjacent thereto for isolating the electrolytes within their respective cell segments. The wrapper may create and/or maintain the support needed for these seals such that the seals may resist expansion of the ESD as the internal pressures in the cell segments increase. The wrapper may be made of any suitable material, including, but not limited to, nylon, any other polymer or elastic material, including reinforced composites, nitrile rubber, or polysulfone, or shrink wrap material, or any rigid material, such as enamel coated steel or any other metal, or any insulating material, any other suitable material, or combinations thereof, for example. In certain embodiments, the wrapper may be formed by an exoskeleton of tension clips, for example, that may maintain continuous pressure on the seals of the stacked cells. A non-conductive barrier may be provided between the stack and wrapper to prevent the ESD from shorting.

With continued reference to FIG. 5, for example, bi-polar ESD 50 of the invention may include a plurality of cell segments (e.g., cell segments 22a-e) formed by MPUs 12 and 32, and the stack of one or more BPUs 2a-d therebetween. In accordance with an embodiment of the invention, the thicknesses and materials of each one of the substrates (e.g., substrates 6a-d, 16, and 36), the electrode layers (e.g., positive layers 4a-d and 14, and negative layers 8a-d and 38), the electrolyte layers (e.g., layers 10a-e), and the gaskets (e.g., gaskets 60a-e) may differ from one another, not only from cell segment to cell segment, but also within a particular cell segment. This variation of geometries and chemistries, not only at the stack level, but also at the individual cell level, may create ESDs with various benefits and performance characteristics.

Additionally, the materials and geometries of the substrates, electrode layers, electrolyte layers, and gaskets may vary along the height of the stack from cell segment to cell segment. With further reference to FIG. 5, for example, the electrolyte used in each of the electrolyte layers 10a-e of ESD 50 may vary based upon how close its respective cell segment 22a-e is to the middle of the stack of cell segments. For example, innermost cell segment 22c (i.e., the middle cell segment of the five (5) segments 22 in ESD 50) may include an electrolyte layer (i.e., electrolyte layer 10c) that is formed of a first electrolyte, while middle cell segments 22b and 22d (i.e., the cell segments adjacent the terminal cell segments in ESD 50) may include electrolyte layers (i.e., electrolyte layers 10b and 10d, respectively) that are each formed of a second electrolyte, while outermost cell segments 22a and 22e (i.e., the outermost cell segments in ESD 50) may include electrolyte layers (i.e., electrolyte layers 10a and 10e, respectively) that are each formed of a third electrolyte. By using higher conductivity electrolytes in the internal stacks, the resistance may be lower such that the heat generated may be less. This may provide thermal control to the ESD by design instead of by external cooling techniques.

As another example, the active materials used as electrode layers in each of the cell segments of ESD 50 may also vary based upon how close its respective cell segment 22a-e is to the middle of the stack of cell segments. For example, innermost cell segment 22c may include electrode layers (i.e., layers 8b and 4c) formed of a first type of active materials having a first temperature and/or rate performance, while middle cell segments 22b and 22d may include electrode layers (i.e., layers 8a/4b and layers 8c/4d) formed of a second type of active materials having a second temperature and/or rate performance, while outermost cell segments 22a and 22e may include electrode layers (i.e., layers 38/4a and layers 8d/14) formed of a third type of active materials having a third temperature and/or rate performance. As an example, an ESD stack may be thermally managed by constructing the innermost cell segments with electrodes of nickel cadmium, which may better absorb heat, while the outermost cell segments may be provided with electrodes of nickel metal hydride, which may need to be cooler, for example. Alternatively, the chemistries or geometries of the ESD may be asymmetric, where the cell segments at one end of the stack may be made of a first active material and a first height, while the cell segments at the other end of the stack may be of a second active material and a second height.

Moreover, the geometries of each of the cell segments of ESD 50 may also vary along the stack of cell segments. Besides varying the distance between active materials within a particular cell segment, certain cell segments 22a-e may have a first distance between the active materials of those segments, while other cell segments may have a second distance between the active materials of those segments. In any event, the cell segments or portions thereof having smaller distances between active material electrode layers may have higher power, for example, while the cell segments or portions thereof having larger distances between active material electrode layers may have more room for dendrite growth, longer cycle life, and/or more electrolyte reserve, for example. These portions with larger distances between active material electrode layers may regulate the charge acceptance of the ESD to ensure that the portions with smaller distances between active material electrode layers may charge first, for example.

In an embodiment, the geometries of the electrode layers (e.g., positive layers $4a$-$d$ and $14$, and negative layers $8a$-$d$ and $38$ of FIG. 5) of ESD 50 may vary along the radial length of substrates $6a$-$d$. With respect to FIG. 5, the electrode layers are of uniform thickness and are symmetric about the electrode shape. In an embodiment, the electrode layers may be non-uniform. For example, the positive active material electrode layer and negative active material electrode layer thicknesses may vary with radial position on the surface of the conductive substrate. Non-uniform electrode layers are discussed in more detail in West et al. U.S. patent application Ser. No. 12/258,854, which is hereby incorporated by reference herein in its entirety.

Although each of the above described and illustrated embodiments of a stacked ESD show a cell segment including a gasket sealed to each of a first and second electrode unit for sealing an electrolyte therein, it should be noted that each electrode unit of a cell segment may be sealed to its own gasket, and the gaskets of two adjacent electrodes may then be sealed to each other for creating the sealed cell segment.

In certain embodiments, a gasket may be injection molded to an electrode unit or another gasket such that they may be fused together to create a seal. In certain embodiments, a gasket may be ultrasonically welded to an electrode unit or another gasket such that they may together form a seal. In other embodiments, a gasket may be thermally fused to an electrode unit or another gasket, or through heat flow, whereby a gasket or electrode unit may be heated to melt into an other gasket or electrode unit. Moreover, in certain embodiments, instead of or in addition to creating groove shaped portions in surfaces of gaskets and/or electrode units to create a seal, a gasket and/or electrode unit may be perforated or have one or more holes running through one or more portions thereof. Alternatively, a hole or passageway or perforation may be provided through a portion of a gasket such that a portion of an electrode unit (e.g., a substrate) may mold to and through the gasket. In yet other embodiments, holes may be made through both the gasket and electrode unit, such that each of the gasket and electrode unit may mold to and through the other of the gasket and electrode unit, for example.

Although each of the above described and illustrated embodiments of the stacked ESD show an ESD formed by stacking substrates having substantially round cross-sections into a cylindrical ESD, it should be noted that any of a wide variety of shapes may be utilized to form the substrates of the stacked ESD of the invention. For example, the stacked ESD of the invention may be formed by stacking electrode units having substrates with cross-sectional areas that are rectangular, triangular, hexagonal, or any other desired shape or combination thereof.

It will be understood that the foregoing is only illustrative of the principles of the invention, and that various modifications may be made by those skilled in the art without departing from the scope and spirit of the invention. It will also be understood that various directional and orientational terms such as "horizontal" and "vertical," "top" and "bottom" and "side," "length" and "width" and "height" and "thickness," "inner" and "outer," "internal" and "external," and the like are used herein only for convenience, and that no fixed or absolute directional or orientational limitations are intended by the use of these words. For example, the devices of this invention, as well as their individual components, may have any desired orientation. If reoriented, different directional or orientational terms may need to be used in their description, but that will not alter their fundamental nature as within the scope and spirit of this invention. Those skilled in the art will appreciate that the invention may be practiced by other than the described embodiments, which are presented for purposes of illustration rather than of limitation, and the invention is limited only by the claims that follow.

What is claimed is:

1. An energy storage device (ESD) comprising:
    at least two bi-polar electrode units provided in a stacking direction, wherein each electrode unit comprises:
        a conductive substrate;
        a positive active material electrode layer on a first surface of the conductive substrate; and
        a negative active material electrode layer on a second surface of the conductive substrate;
    an electrolyte layer provided between the electrode units;
    a flexible gasket positioned about the electrolyte layer wherein the gasket is mechanically deformable in a predetermined direction along at least the stacking direction and along an axis normal to the stacking direction; and
    a rigid component positioned about the flexible gasket, wherein the rigid component and the flexible gasket are separated by a gap, and wherein the flexible gasket is configured to mechanically deform into the gap.

2. The ESD of claim 1 wherein the flexible gasket maintains the inter-electrode spacing of the positive active material electrode layer and the negative active material electrode layer during operation of the ESD.

3. The ESD of claim 1 wherein the flexible gasket minimizes the movement of the positive active material electrode layer and the negative active material electrode layer relative to one another.

4. The ESD of claim 1 further comprising:
    a plurality of springs, the springs configured to deflect in response to an increase in the pressure within the ESD.

5. The ESD of claim 1 further comprising a separator within the electrolyte layer, the separator electrically isolating a respective positive active material electrode layer from a respective negative active material electrode layer.

6. The ESD of claim 1 further comprising a hard stop positioned radially outwardly from the gasket.

7. The ESD of claim 6 wherein the hard stop comprises an inner rim with a shelf on which the respective outer edge of the plurality of electrodes is aligned.

8. The ESD of claim 7 wherein the shelf on the inner rim sets the spacing between adjacent electrodes of the ESD.

9. The ESD of claim 6 wherein the hard stop further comprises:
    a plurality of studs; and
    a plurality of stud holes, the plurality of stud holes adapted to engage a respective stud on an adjacent hard stop.

10. The ESD of claim 9 wherein the studs are adapted to engage the stud holes to align adjacent hard stops without the use of tools.

11. The ESD of claim 9 wherein the plurality of studs align a substrate flange of the substrate to the hard stop by keeping the substrate centered on an axis colinear with the stacking direction of the stack assembly.

12. The ESD of claim 6 wherein the hard stop comprises an outer rim having a set of holes for a plurality of compression bolts, the holes aligning the stack of electrodes during assembly and providing stability during operation of the ESD.

13. The ESD of claim 1 wherein the predetermined direction is in a stacking direction that is normal to the surface of the electrodes.

14. The ESD of claim 1 wherein the predetermined direction is radially outwardly from a stacking direction.

15. The ESD of claim 1 wherein the predetermined direction is in an off-axes direction.

16. The ESD of claim 1 wherein the flexible gasket has a plurality of predetermined directions.

17. The ESD of claim 1 wherein the deformation of the gasket reduces internal stresses within each cell of the ESD by equalizing pressure within the ESD while maintaining optimal inter-electrode spacing.

18. The ESD of claim 1 wherein the electrolyte layer is sealed by the conductive substrates of the electrode units and the flexible gasket positioned about the electrolyte layer.

19. The ESD of claim 1 wherein the rigid component is one of a hard stop, containment vessel, or wrapper.

* * * * *